United States Patent [19]
> Mailandt et al.

[11] Patent Number: 4,823,280

[45] Date of Patent: Apr. 18, 1989

[54] COMPUTER-CONTROLLED ELECTRONIC SYSTEM MONITOR

[75] Inventors: Peter Mailandt, Dallas; John R. Hicks, Lone Oak, both of Tex.

[73] Assignee: Decibel Products, Inc., Dallas, Tex.

[21] Appl. No.: 25,216

[22] Filed: Mar. 12, 1987

[51] Int. Cl.$^4$ ................. G06K 15/00; G01R 19/00
[52] U.S. Cl. .................... 364/514; 364/550; 364/483; 340/552; 324/58.5 R
[58] Field of Search ............. 364/481, 483, 514, 550, 364/551; 324/103 R, 140 R, 141, 142, 58 R, 58 A, 58.5 R, 58.5 A, 58 B, 58.5 B; 340/514, 517, 526, 635, 653, 660, 661, 664, 540, 541, 552

[56] References Cited

U.S. PATENT DOCUMENTS

| | | | |
|---|---|---|---|
| 4,263,653 | 4/1981 | Mecklenburg | 364/483 |
| 4,589,074 | 5/1986 | Thomas et al. | 364/481 |
| 4,630,218 | 12/1986 | Hurley | 364/481 |
| 4,654,806 | 3/1987 | Poyser et al. | 364/481 |
| 4,672,555 | 6/1987 | Hart et al. | 364/481 |

*Primary Examiner*—Parshotam S. Lall
*Assistant Examiner*—Brian M. Mattson
*Attorney, Agent, or Firm*—Hubbard, Thurman, Turner & Tucker

[57] ABSTRACT

An electric power monitor system for radio communication (trunking and paging repeater base station) systems includes a plurality of input switches, power sensors, a power monitor having a display, keyboard, and microprocessor, a printer port, and communications port. The input switches facilitate alarm inputs, for example, unauthorized entry, flooding, fire, and temperature of the antenna site. The power sensors include bidirectional and unidirectional sensors connected to a communication system having tunable components for producing analog signals indicative of system component performance. The power monitor measures, determines, and reports locally and/or remotely the power output and standing wave ratio of transmitters and antennas, insertion loss of combiners and power to and SWR of antennas and alarms. Specific measurements and computations are: (1) transmitter input power forward to the combiner; (2) reflected transmitter power on the input side of the combiner; (3) reflected power from the antenna side of the combiner; (4) transmitter voltage standing wave ratio; (5) combiner insertion loss (IL) per channel; (6) time and date of most recent channel measurement; (7) antenna voltage standing wave ratio; and (8) combiner power to the antenna. The display shows either single measurements or dual measurements of any selected pair of the foregoing measurements. The measurements are compared to acceptable norms and an alarm system will automatically and remotely signal outside-the-norm measurements of the antenna, combiner, and transmitters as well as the selected environmental conditions.

8 Claims, 18 Drawing Sheets

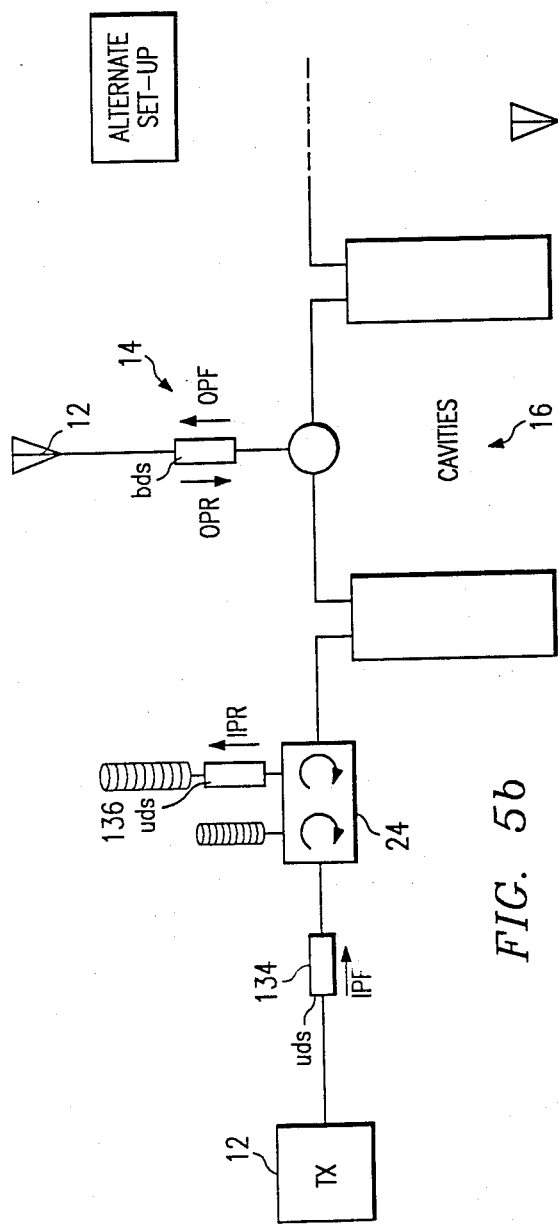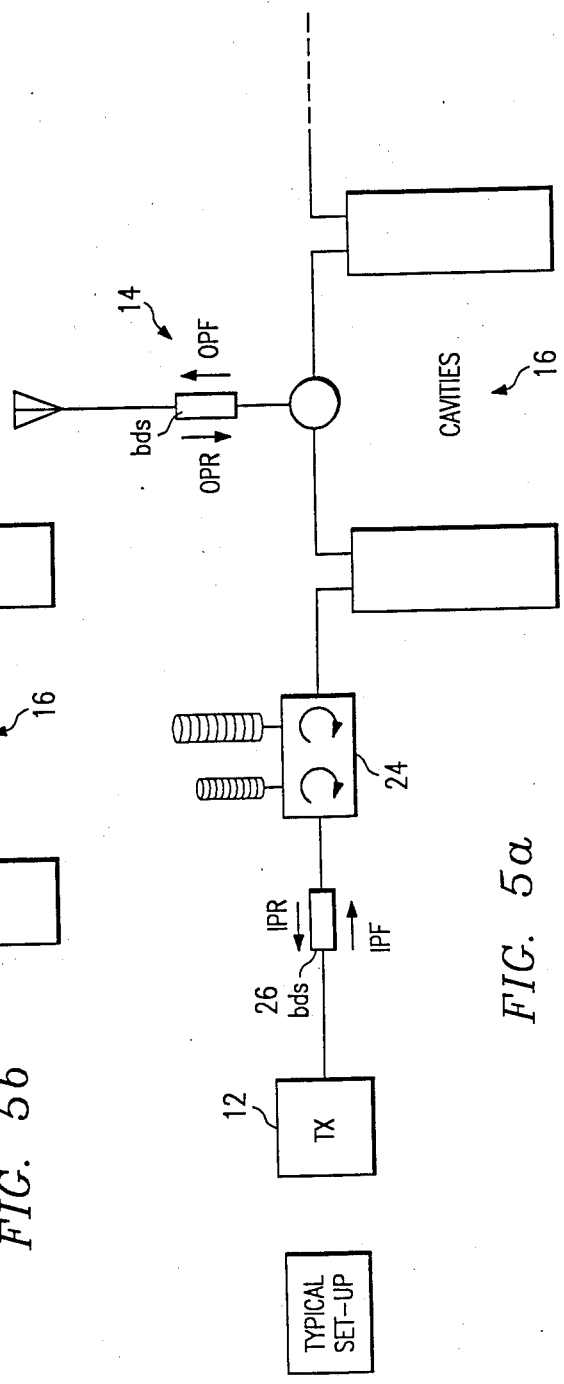
FIG. 5a
FIG. 5b

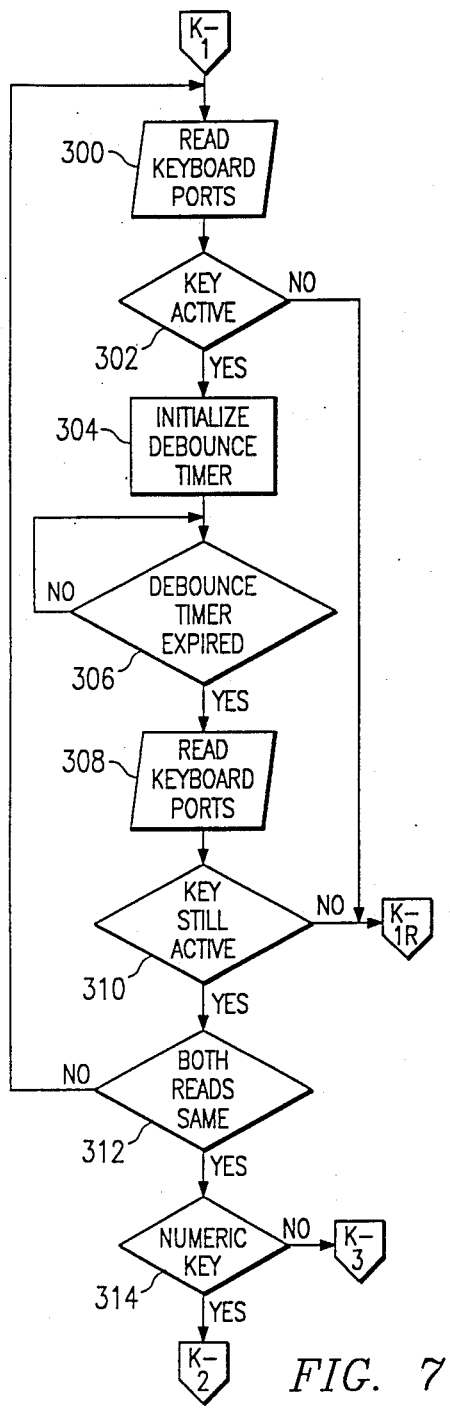
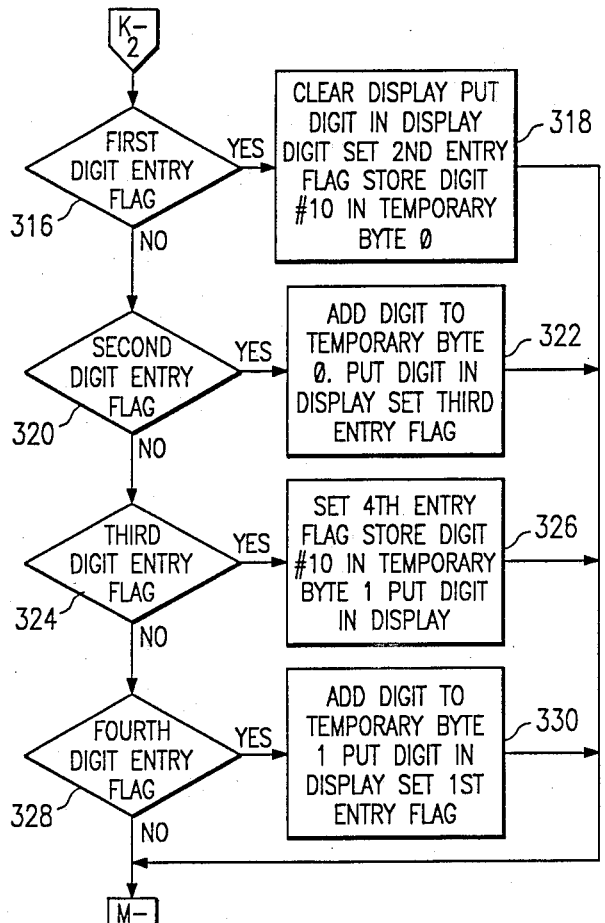
FIG. 7a
FIG. 7b

POWER MONITOR CRT PROCESSING

COMPUTER-CONTROLLED ELECTRONIC SYSTEM MONITOR

BACKGROUND OF THE INVENTION

This invention relates to electronic monitoring systems and more particularly to a computer-controlled monitoring system for monitoring continuously and accurately the operation of communication systems.

Electronic monitors of various degrees of complexity are known. They range from very simple power monitors, which measure power at a specific location near the transmitter, circulator, cavity, N-way junction or antenna, to more versatile models which provide remote readout at an off-site panel that accepts and/or delivers information pertaining to power level and voltage standing wave ratio (VSWR). In addition, some units are known to include remote communication of alarms, corresponding on/off power conditions, and local environment conditions, such as temperature, humidity, intrusion and fire.

The problems with the known monitoring devices include their inability to generate and communicate actual measurements, to permit the programming of upper and lower operating limits, and to adapt to specific operator needs, such as to calculate specific insertion loss characteristics across filters and cavities.

A major advantage of the monitor of the present invention over known monitors is the provision of a computer-controlled, expandable electronic monitoring system. The system of the present invention accurately and continuously monitors electronic systems, programs their operating parameters, meets various user needs, and tunes or retunes any tunable components without degrading overall performance of the system being monitored. These features enable the monitor to detect "soft" failures of the systems being monitored. Soft failures are the result of a slowly degrading system component, such as a corroding connector or a gradual shift in a cavity's resonant frequency. With properly set alarm limits, the monitoring system uncovers and communicates a transmit problem when performance drops below tolerable limits.

SUMMARY OF THE INVENTION

Accordingly, it is an object of the present invention to provide an improved electronic system monitor to give accurate information continuously from which "soft" failures can be detected and repaired prior to actual system failure, thereby reducing system downtime and maintenance and repair costs.

Another object of this invention is to provide an electronic system monitor operable in a centralized control center for monitoring one or more electronic systems remotely located with respect to the system center.

Still another object of the invention is to provide a monitor capable of simultaneous operation with an electronic system without interrupting or degrading the electronic system operation.

Yet another object of the invention is to provide a monitor having multiple alarm inputs and automatic remote or local alarm reporting.

A further object of the invention is to provide a monitor capable of measuring the operational outputs of a plurality of electronic systems.

Still yet a further object of the invention is to provide a monitor having component tuning aid capability.

Briefly stated, the electronic system monitor apparatus of the present invention includes a compact, computer-controlled, expandable monitor system having remote sensors for accurately measuring the actual power-related performance of a plurality of components of one or more electronic systems and their local environmental conditions. A decision maker is connected to some or all of the sensors and compares the measured power-related outputs of the sensors to normal operating limits for determining deteriorating components. The decision maker activates an appropriate alarm, and reports any abnormal component or environmental conditions to a central or remote station either automatically or upon command. At the station the report is displayed or printed or both. The decision maker also provides information for use in tuning or retuning tunable components.

BRIEF DESCRIPTION OF THE DRAWINGS

Other objects and features of the invention will become more readily apparent from the detailed description when read in conjunction with the accompanying drawings in which:

FIGS. 5a–5b are block diagrams of two typical monitor and sensor arrangements of the present invention;

FIGS. 7a–7e are keyboard flowcharts for the power monitor of the present invention;

DETAILED DESCRIPTION OF THE PREFERRED EMBODIMENT

Figure 1:
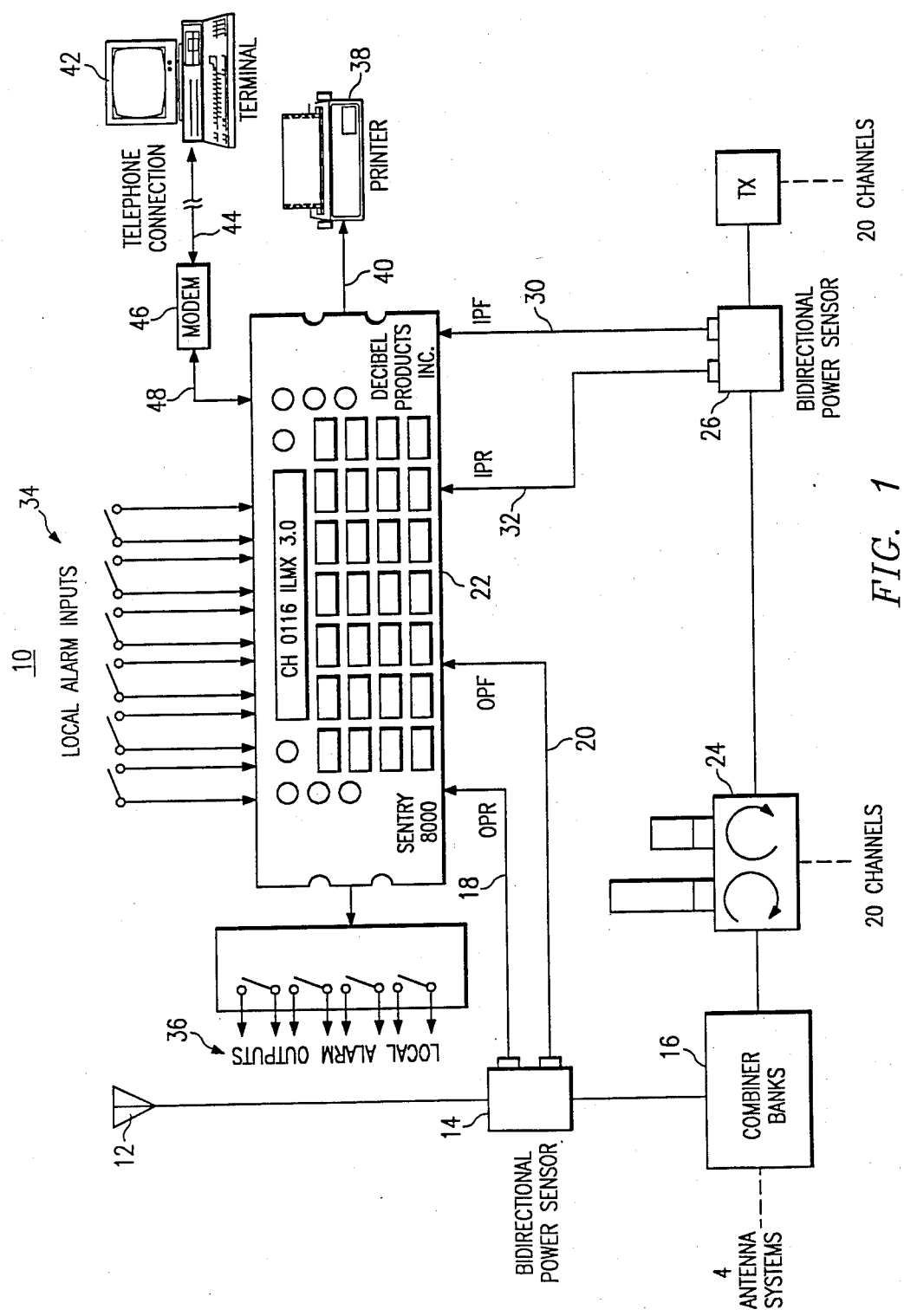
FIG. 1 is a block diagram of the monitoring system of the present invention with in-line sensors in place.

The computer-controlled electronic system monitoring system 10 of the present invention is shown in FIG. 1 in connection with an antenna system, by way of example only and not by way of limitation. The monitor of the present invention is applicable to all communications systems operating from 35 MHz to 1 GHz, including SMR trunked, conventional, paging cellular, mobile radio and aviation. The monitor of the present invention can report on a plurality of antenna systems and any combination of a plurality of transmitters and channels therefor.

The monitor of the present invention is shown connected to a transmitter site system (FIG. 1) with in-line sensors of the monitoring system 10 in place. The combined antenna system and monitor system includes a transmitter antenna 12 having a bidirectional power sensor 14 connected between the antenna and a bank of combiners 16 each for a plurality of antenna systems. The bidirectional power sensor 14 is connected by leads 18 and 20 to a programmable controller 22. A circulator 24 for a plurality of communications channels is connected to the combiner banks 16, and a bidirectional power sensor 26 is connected between the circulator 24 and a transmitter 28 serving a plurality of channels. The bidirectional power sensor 26 is connected by leads 30 and 32 to the programmable controller 22.

A plurality of local alarm input circuits 34 are connected to the programmable controller for inputting information indicative of various operating failures and adverse local environmental conditions at the antenna sites. Also, a plurality of local alarm output circuits 36 are connected to the programmable controller 22.

A printer 38 is connected by bus 40 to the programmable controller 22. Upon command from the programmable computer, the printer prints selected information from the programmable computer.

A terminal 42 that provides two-way communication to the programmable controller completes the combined system. The terminal is connected by a telephone connection 44 to a MODEM 46. The MODEM 46 is connected by lead 48 to the programmable controller.

The in-line antenna bidirectional sensor 14 inputs analog (dc) signals indicative of the output reflected power (OPR) from the antennas for a particular channel through lead 18 to the programmable controller 22 for display in watts. The sensor 14 also inputs analog signals indicative of the output forward power (OPF) of the combiner 16 for a given antenna through lead 20 to the programmable controller 22 for display in watts.

In addition, the in-line combiner bidirectional sensor 26 inputs analog signals indicative of the input forward power (IPF) to the combiner 16 for a particular channel on lead 30 to the programmable controller for display in watts. Further, the sensor 26 inputs analog signals indicative of the input reflected power from the combiner 16 for a particular channel through lead 32 to the programmable controller for display in watts. This sensor arrangement will be discussed further in connection with a second arrangement hereinafter.

The local alarm system circuits 34 include sensors to facilitate flexible and diverse local alarm needs such as, for example, intrusion, temperature, and flooding in addition to the outside-the-norm measurements of the antenna, combiner, and transmitter.

Figure 2:
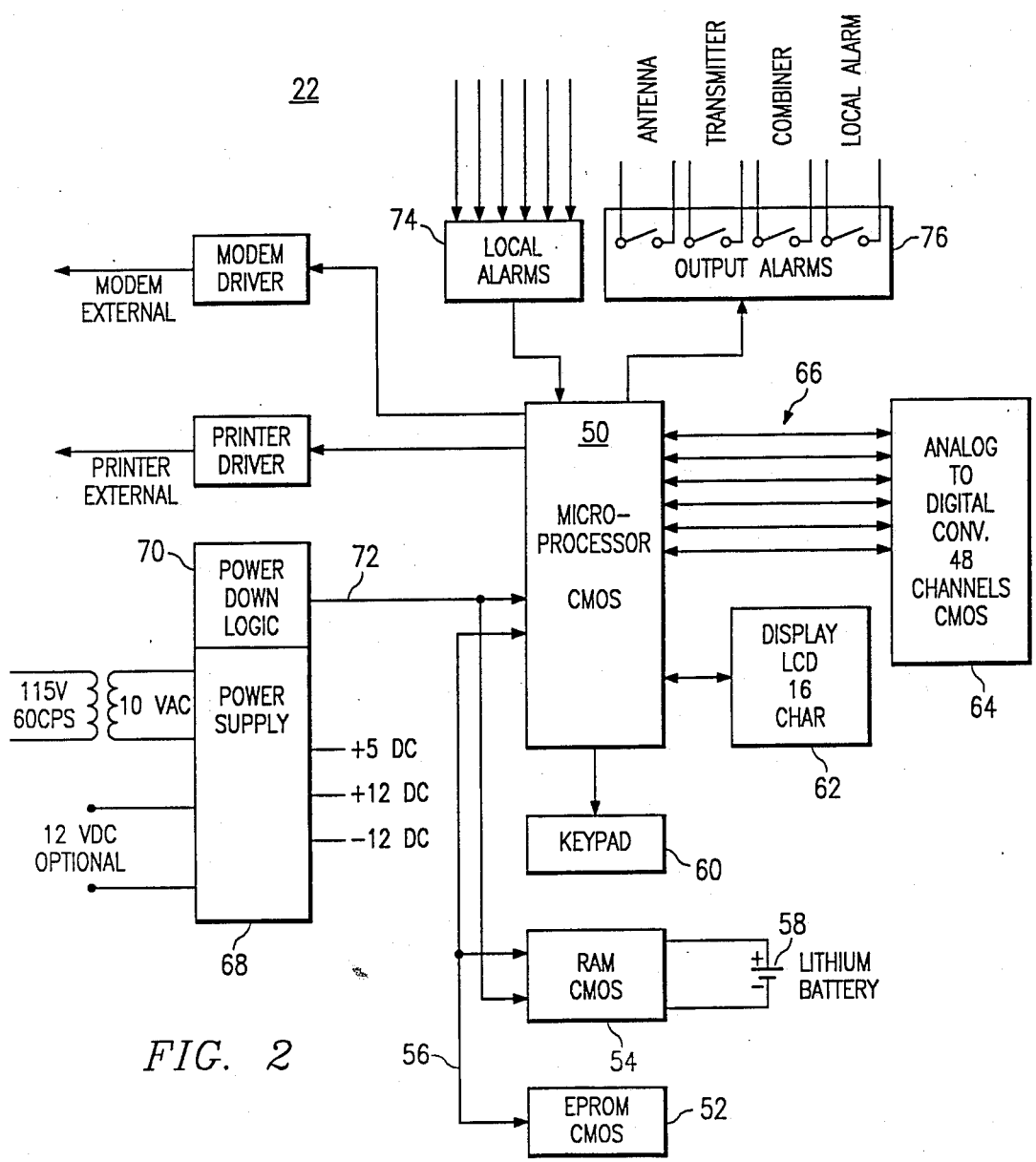
FIG. 2 is a block diagram of the programmable controller of the present invention.

The programmable controller 22 (FIG. 2) includes a computer 50. A suitable computer is an INTEL 8085 microprocessor sold by INTEL Corporation. An electrically programmable read only memory (EPROM) 52 and a random access memory (RAM) 54 are connected by bus 56 to the microprocessor 50. The EPROM stores instructions to adapt the system to user needs and the RAM stores the system acquired data or information by date and time provided by the microprocessor clock. The RAM 54 is protected from a power down situation by a battery 58 (Lithium battery).

A keyboard 60 is used to enter operation parameters and to call up information for display on a display 62. The display 62 is, for example, a 16 digit liquid crystal display connected to the microprocessor.

An analog to digital converter (ADC) 64 having a plurality of channels for digitizing the incoming analog (dc) data signals is connected by leads 66 to the microprocessor 50.

The microprocessor 50, EPROM 52, RAM 54, and ADC 64 and interface circuitry are preferably complementary metal oxide semiconductor (MOS) integrated circuit (IC) devices because they are readily available, have less power consumption and dissipation, and exhibit high impedance characteristics. Thus, a small lithium battery will hold the RAM for about three years, and the high impedance of CMOS devices allow interfacing without disruption of the system.

The microprocessor 50 is connected to a power supply 68. The power supply provides a +5 volt and a ±12 volt source of power for the system from either an ac or dc power source. The power supply is connected to power-fail circuit 70. The power-fail circuit is connected by lead 72 to the microprocessor and RAM to signal when power failure is imminent to initiate a routing to save all volatile data. After power restoration, a routine is initiated to restore the data and restart computer operation.

The local alarm signals are received in a register 74 and multiplexed into the microprocessor 50 for processing. The microprocessor 50 is connected to a solid state relay device 76 for outputting alarm signals to antenna, transmitter, combiner, or local alarm action circuits.

Figure 3:
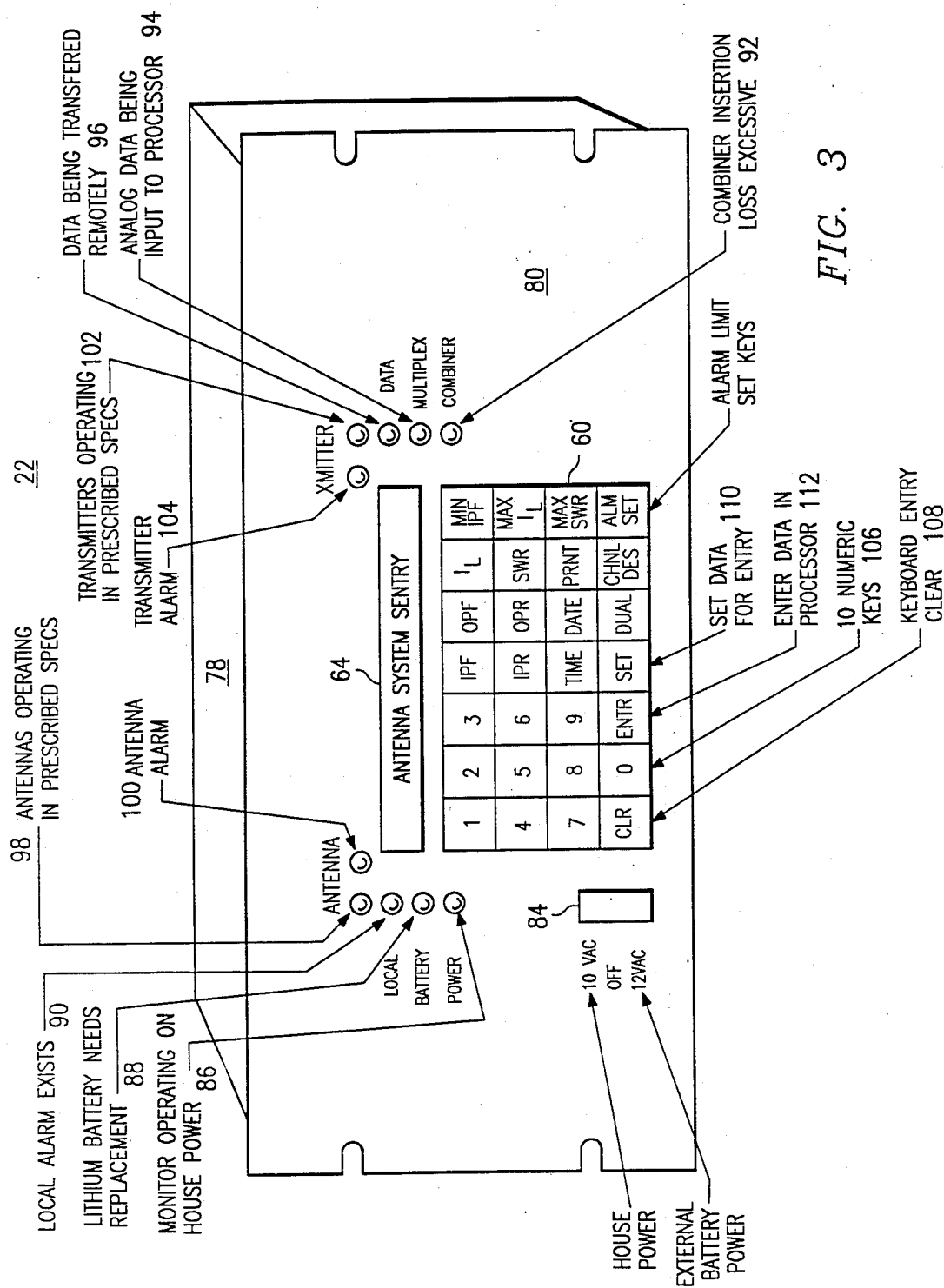
FIG. 3 is an isometric view of the programmable controller including the front panel arrangement of the present invention.
Figure 4:
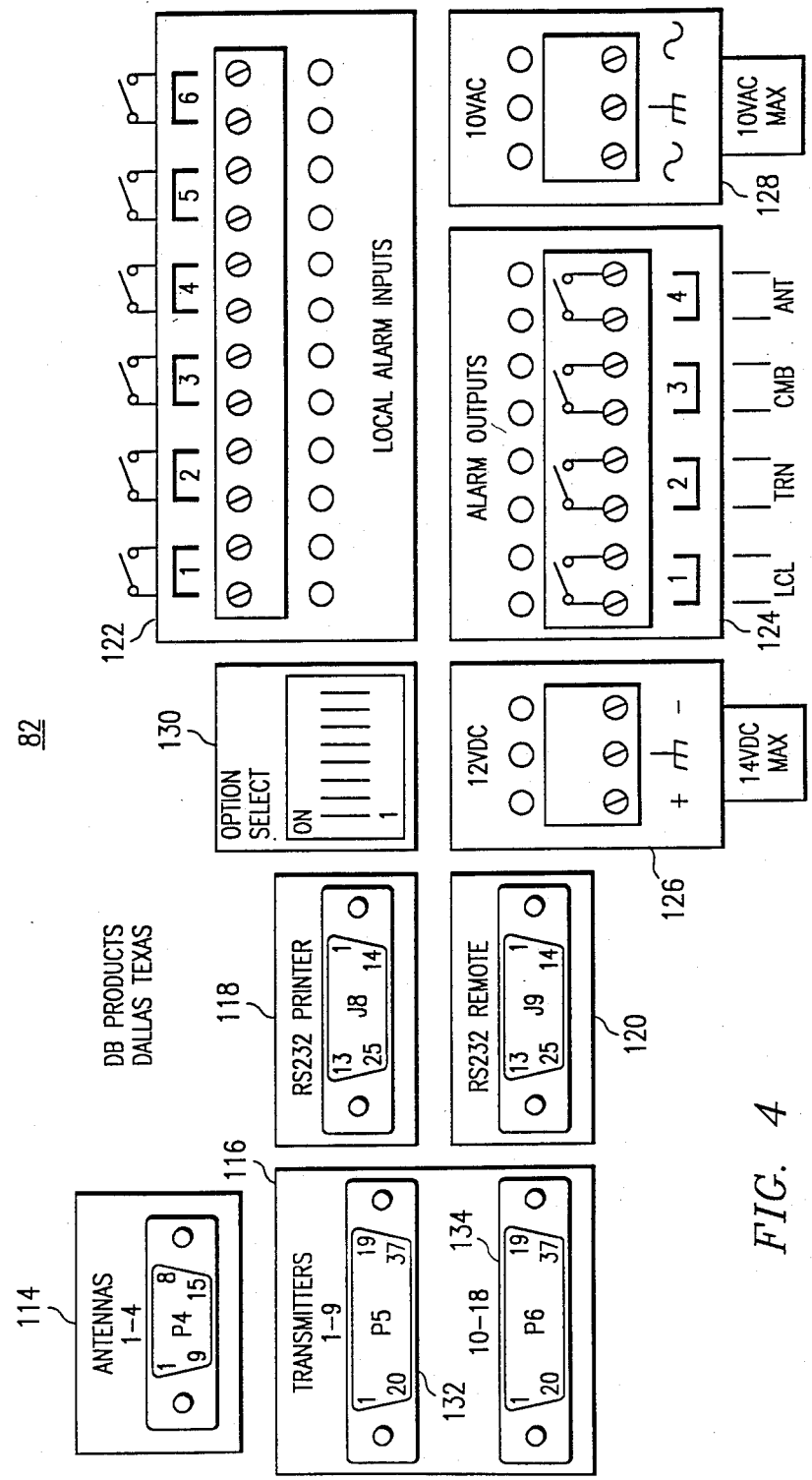
FIG. 4 is a view of the programmable controller connection panel of the present invention.

The programmable controller 22 includes a housing 78 (FIG. 3) for housing the circuitry of the programmable controller, a front panel 80, and a connector panel 82 (FIG. 4).

The programmable front panel 80 includes a switch 84 having an OFF position between ac and dc power positions. A plurality of status lights (LEDs) are connected to the microprocessor as action circuits indicating the operational status of the system as follows.

Lights 86, 88, and 90 on a first side of the panel are turned on to indicate, respectively, that the monitor is operating on home power, the lithium battery for the data storage RAM needs replacement, and a local alarm exists. While, lights 92, 94, and 96 on a second or opposing side are turned on to indicate, respectively, that the combiner insertion loss is excessive, the analog data is being input to the processor, and the data is being transferred remotely. Indicator lights 86, 94, and 96 being of an informative nature are green lights; while lights 88, 90, and 92 being trouble indicating lights are red lights.

Antenna status lights 98 and 100 are turned on and off, respectively, to indicate whether the plurality of antennas are operating within prescribed parameters or an antenna alarm exists. The former is green and the latter is red.

Similarly, transmitter lights 102 and 104 are turned on and off with a green light 102 indicating that the transmitters are operating within prescribed parameters and a red light indicating a transmitter alarm.

The 16 character liquid crystal display (LCD) 64 is positioned directly above the 28 key keyboard 60. The 28 key keyboard 60 includes 10 numeric (1, 2, 3, . . . 0) keys 106 for providing numeric entry and access information. The specific entry and access keys include the usual clear 108, set 110, and enter 112 keys for clearing the keyboard of all information before it is entered in the processor, initializing new information to be input into the keyboard, and instructing the processor to take keyboard instructions and store them in memory.

The remaining specific keys are as follows:

An input forward power (IPF) key is to display in watts the input forward power to the combiner for a selected channel.

An output forward power (OPF) key is to display in watts the output forward power of the combiner for a selected antenna.

An insertion loss (IL) key identifies the channel loss through the combiner measured in dB.

A time of day (TME) key is to set a 24-hour clock in the processor one time and thereafter to update the date.

A dual display (DUL) key is used to enter a dual display mode. When in the dual mode, the processor shows two separate desired measurements on the same display. For example, when tuning a combiner, the value of IPR and OPF may be desired to show on the same display so that OPF may be optimized and IPR minimized.

A channel designate (CNL/DES) key is used to designate the antennas and channel(s) to be monitored and reported. From 0 to 18 channels may be designated in the example described for up-to-four antennas for measurement and monitoring.

An input reflected power (IPR) is used to identify the input reflected power in watts for a particular channel for display.

An output reflected power (OPR) key is used to identify the reflected power in watts from the antenna for a particular channel display.

A voltage standing wave ration (SWR) key displays VSWR in absolute values for any channel or antenna.

A minimum input power forward (MIN/IPF) key is used to set the alarm value for the minimum allowable transmitter output power before an alarm message is set off.

A maximum VSWR (MAX/SWR) key is used to set the alarm value for the maximum allowable VSWR for any channel or antenna before an alarm message is triggered.

A maximum insertion loss (MAX/IL) key permits the setting of the maximum combiner insertion loss value allowed prior to alarm triggering.

An alarm status (ALM/STS) key when momentarily pressed and followed by momentarily pressing the ENTER key will display a list of those channels that have not been cleared. The appropriate alarm is displayed with each channel.

A print (PRNT) key and the ENTER key when momentarily pressed one after the other causes a print out to be made of all channel information and alarm information not cleared to a local printer.

This completes the keys of the keyboard; nevertheless, additional functions are displayed using a combination of the keys simultaneously. A specific unit number for the processor is entered using the (SET) (CNL/DES) keys; while, a specific periodic report time is entered using the (SET) (ALMSTS) keys.

Referring now to FIG. 4, a description is given of the connection panel. The connection panel 82 for the programmable controller includes a pin connector 114 for up to four antennas, a pin connector 116 for up to 18 transmitters, and pin connectors 118 and 120, respectively, for a printer and remote terminal. In addition four terminal blocks 122, 124, 126, and 128 are provided for the local alarm inputs, alarm outputs, 12 V dc and 12 V ac, respectively. An option select dip switch 130 for communication options complete the connection panel.

With respect to the antenna connector 114, each antenna has an OPF pin, OPR pin, and corresponding ground pins. If a fifteen pin connector is used, antennas 3 and 4 share a common ground for OPR. Also to prevent cross-talk on all antenna and transmitter connections from power sensors, a shielded cable is used.

The pin connector 116 for the eighteen transmitters includes two 37 pin connectors 132 and 134. Each pin connector accomodates 9 transmitters. Each transmitter includes an IPF pin, IPR pin, and corresponding ground pins.

The local printer pin connector 118 and the remote terminal pin connector 120 are standard RS 232 connectors each including pin outs as follows:

Chassis and signal grounds (pins 1 and 7), Request to Send (pin 4), Data Terminal Ready (pin 20), Receive Data (pin 3), Transmit Data (pin 2), Clear to Send (pin 5), and Data Bit Ready (pin 6). The MODEM 46 (FIG. 1) has corresponding pins.

The local alarm inputs of terminal block 122 accept external dry contact closures providing the user optional alarm functions for recording and reporting. Thus, the programmable controller may report activation of up to six alarms indicative of, for example, unauthorized entry, high/low temperatures, water level, house power, etc.

The alarm outputs of terminal block 124 provide dry contact closures, capable of 2 amps, when a combiner antenna, transmitter or local alarm in the system shows operation outside preset parameters or conditions.

The dc and ac terminal blocks 126 and 128 provide the option to operate the monitor by conventional housepower with a class 2 transformer or by dc means.

Last, the eight dip switches 130 allow selection of different communication modes, speed of communication, and local printer interfacing.

Referring now to FIGS. 5a and 5b for a description of two typical sensor/antenna arrangements. FIG. 5a is for obtaining a more accurate measurement of combiner insertion loss; FIG. 5b focuses on monitoring reflected power from the cavities for accurate combiner tuning. Both circuits measure antenna plus cable forward and reflected power for calculating the corresponding VSWR and combiner tuning.

The circuit of FIG. 5a is a typical circuit described in connection with FIG. 1. The second circuit is an alternative to the first circuit. The difference is that the bidirectional power sensor 26 of FIG. 5a that is positioned between the transmitter 12 and circulator 24 is replaced by two unidirectional sensors 134 and 136 (FIG. 5b). Unidirectional sensor 134 is positioned between the transmitter 12 and circulator 24 entrance port for measuring the input forward power (IPF). Unidirectional sensor 136 is positioned in the circulator port adjacent to the combiner before the 50 ohm matching resistor. In this arrangement the combiner (cavity) reflected power is measured as the input reflected power (IPR) and provides accurate measurement of the combiner insertion loss including isolation losses.

Figure 6A:
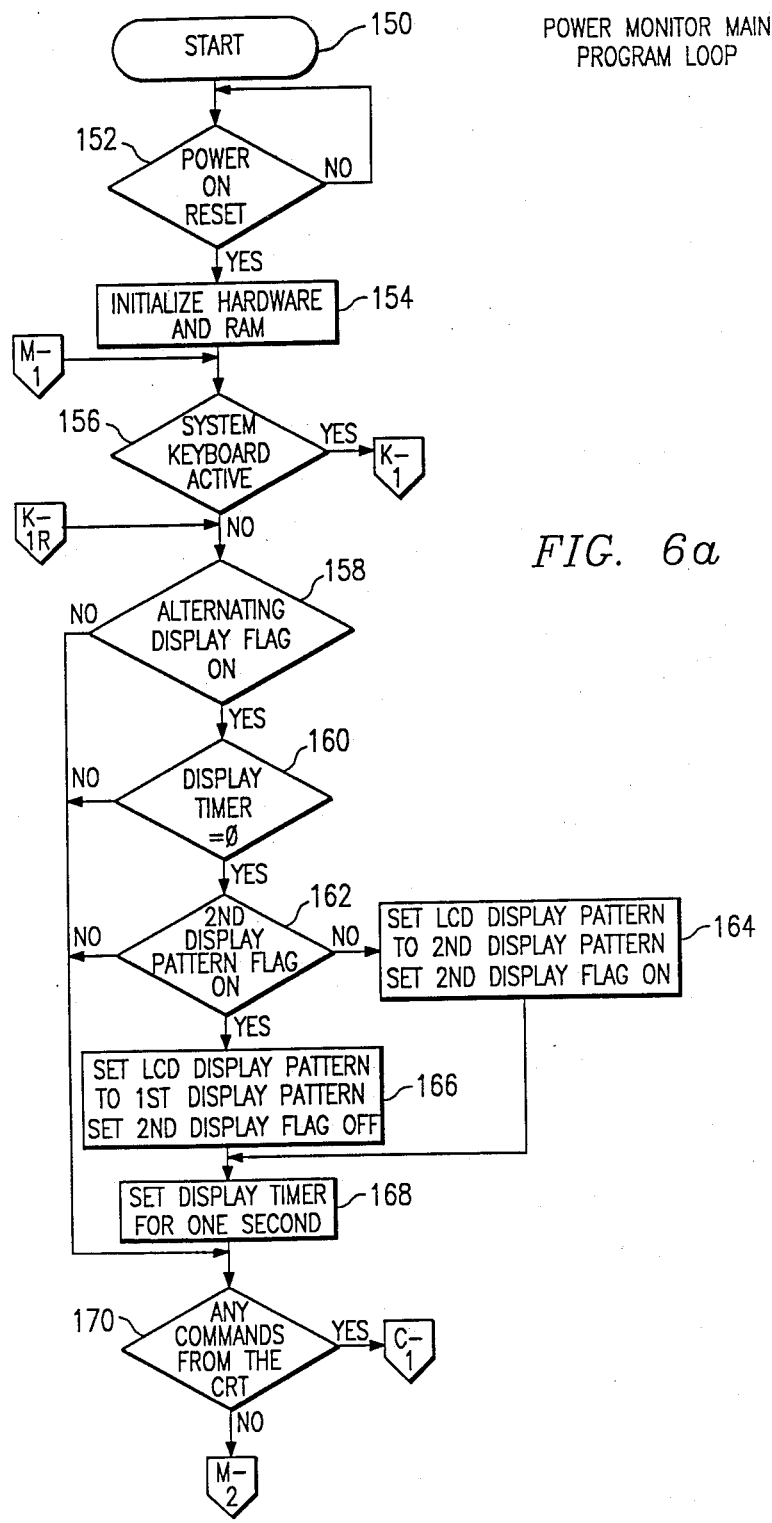
FIGS. 6a–6h are main program loop flowcharts for the power monitor of the present invention.

The operation of the monitor will now be described in connection with the operation flowcharts. The power monitor main program loop (FIG. 6a) starts 150 with a decision 152 whether the power is on and the system reset. If true, an instruction 154 is issued to initialize the hardware and random access memory (RAM); else, return is made to step 152. Next, a decision 156 is made whether the system keyboard is active. If true, the power monitor keyboard subroutine (FIGS. 7a–7e) is entered; else a decision 158 is made whether an alternating display flag is on.

If decision 158 is true, a decision 160 is made whether the display timer is equal to zero; else, a decision 170 is made whether any commands have been received from the CRT. If decision 160 is yes, a decision 162 is made whether a second display pattern flag is on; else the CRT on decision 172 is made. If decision 162 is no, then either the decision 172 is made whether any commands have been received for the cathode ray tube (CRT), or an instruction 164 is issued to set the liquid crystal display (LCD) pattern to the second pattern and to set the second display flag. Then an instruction 168 is issued to set the display timer for one second.

Figure 6B:
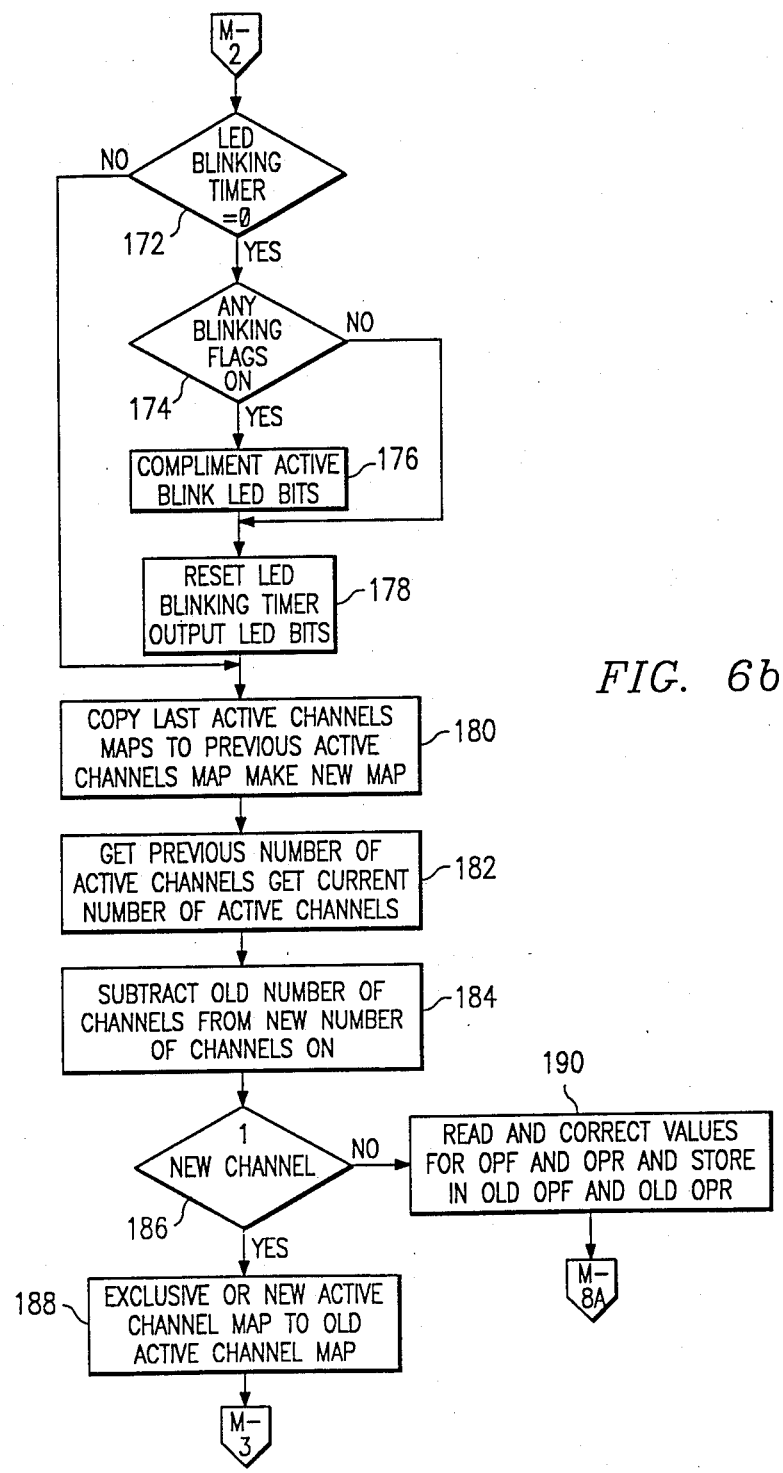
Figure 8A:
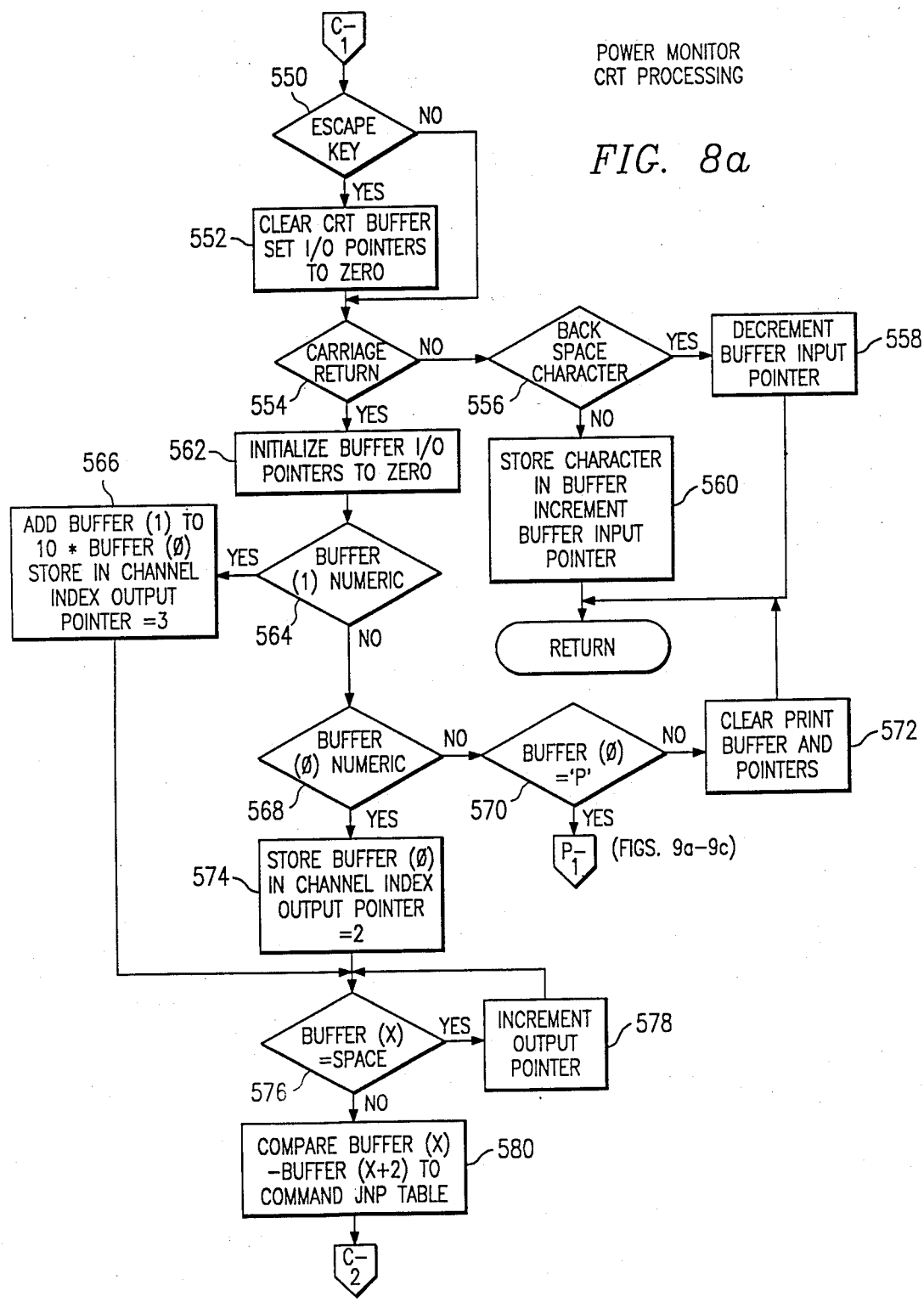
FIGS. 8a–8b are cathode ray tube (CRT) processing flowcharts for the power monitor of the present invention.
Figure 8B:
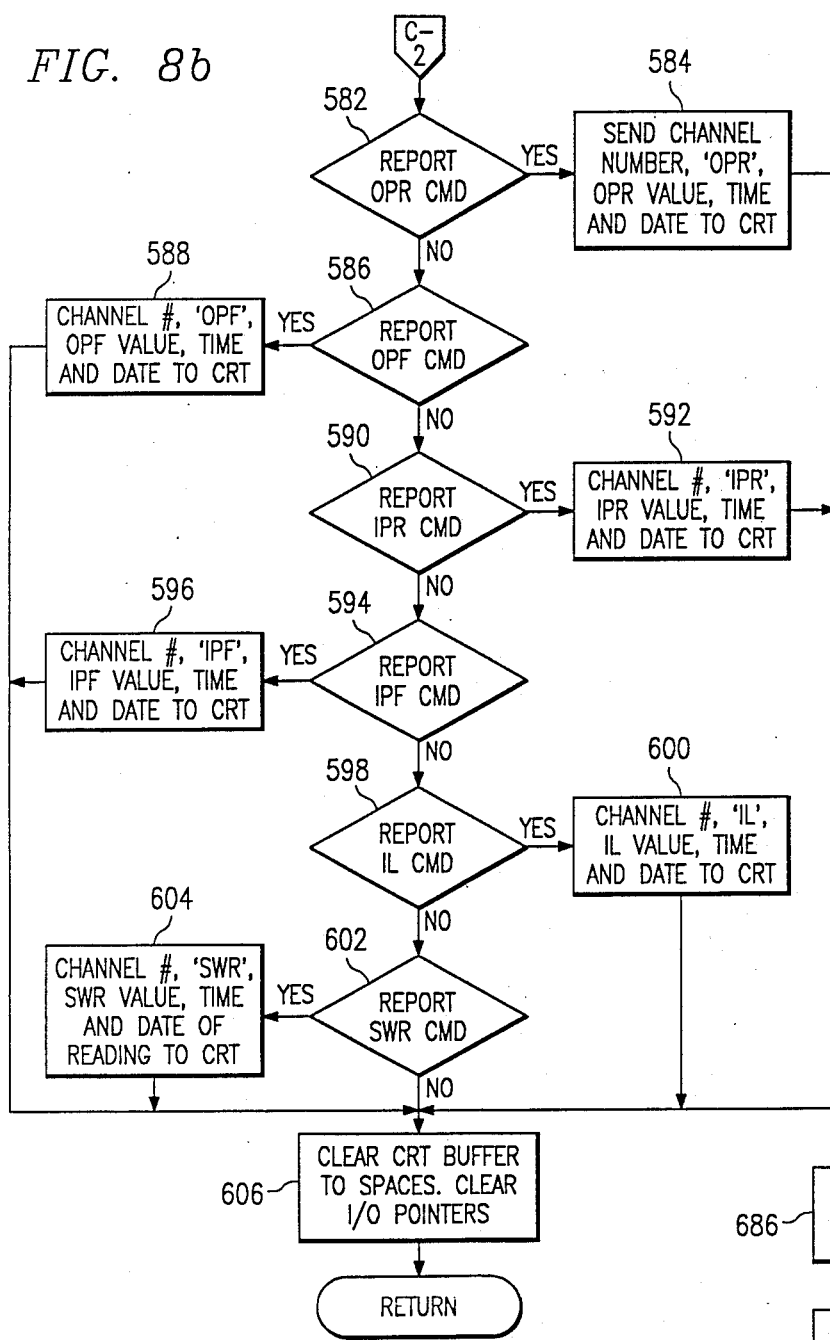

However, if decision 162 is true, an instruction 166 is issued to set LCD display pattern to the first display pattern, turn off the second display flag, and proceed to instruction 168 to set the display timer for one second. After setting the display timer for one second, the decision 170 is made whether any commands have been received from the CRT. If true, the CRT subroutines (FIGS. 8a and 8b) are entered; if false; a decision 172 (FIG. 6b) is made whether the LED blinking timer is equal to zero.

If the LED blinking timer is equal to zero, a decision 174 is made whether any blinking flags are on; otherwise, an instruction 180 is issued to go directly to a map making instruction 180. If decision 174 is true, an instruction 176 is issued to complement the active blink LED bits and an instruction 178 is issued to reset LED blinking timer and output LED bits. If decision 174 is false, only the instruction 178 is issued. Then, the instruction 180 is issued to copy last active channel maps to previous active channels map and make a new map of channels.

Figure 6C:
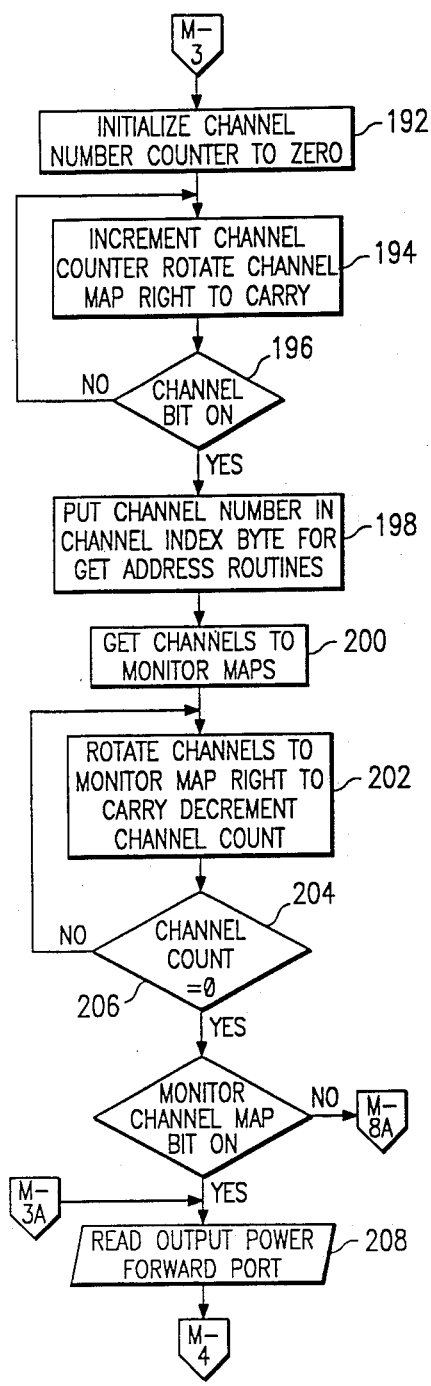
Figure 6D:
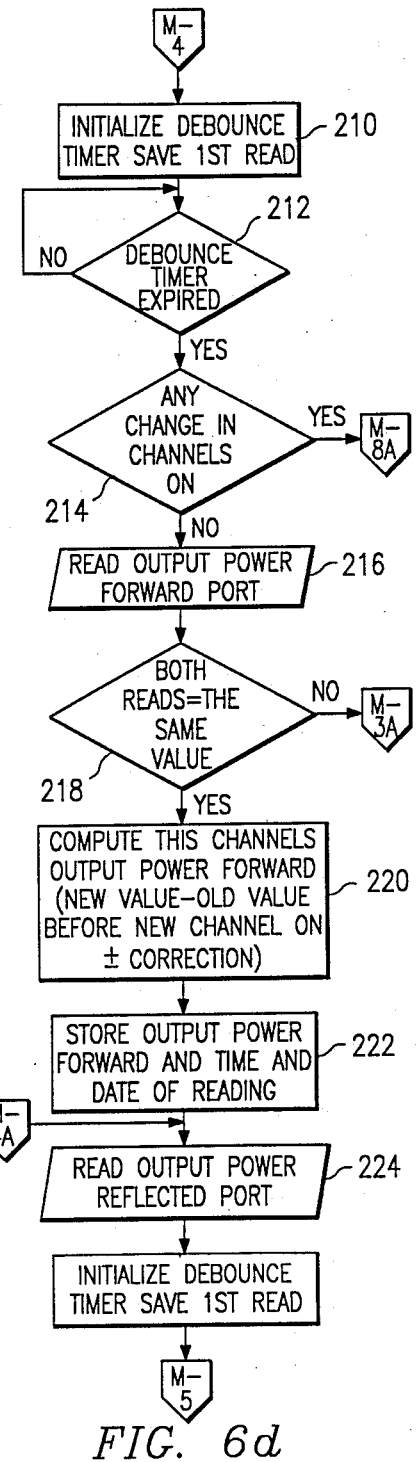
Figure 6E:
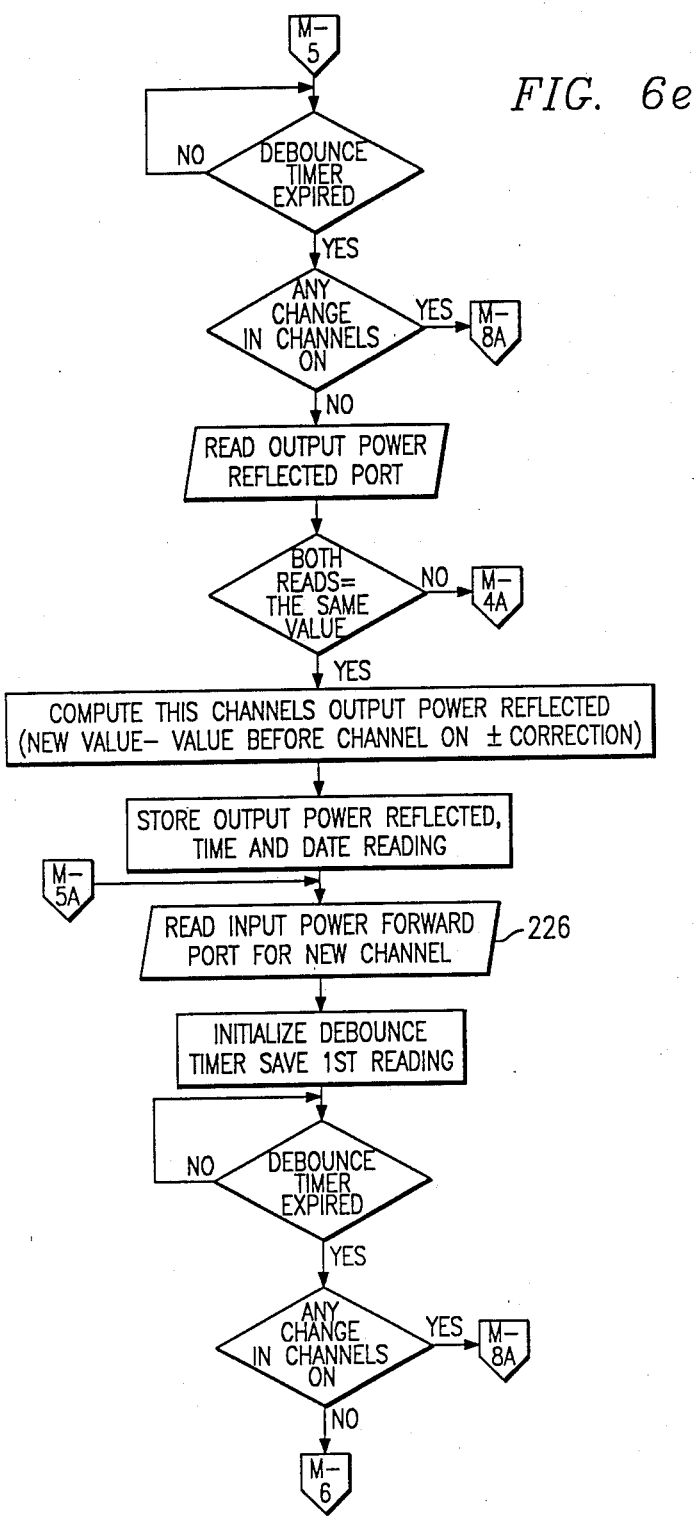

An instruction 182 is then issued to get the previous number of active channels and to get the current number of active channels. Next, an instruction 184 is issued to subtract the previous number of channels from the new number of channels on, and a decision 186 made whether there is a new channel. If yes, an instruction is issued to exclusive OR the new active channel map to the old active channel map. Otherwise, an instruction 190 is issued to read and correct values for output power forward (OPF) and output power reflected and store in the old OPF and OPR positions before proceeding directly to decision 264 (FIG. 6h) as to whether an automatic print time is on and continue.

Next, an instruction 192 (FIG. 6c) is issued to initialize the counter for the number of channels in the system to zero, and an instruction 194 is issued to increment the channel counter for each channel while rotating the channel map to the right to carry. Then a decision 196 is made whether the channel bit is on. If not, return is made to instruction 194; if true, an instruction 198 is issued to put the channel number in channel index byte for the get address routines. Then an instruction 202 is issued to rotate channels to monitor map right to carry decrement channel count and a decision 204 is made whether the channel count has been decremented to zero. If it hasn't, the instruction 202 to decrement the channel count is repeated until true, and then a decision 206 is made whether the monitor channel map bit is on. If the channel map bit is not on, the process skips to decision 264 (FIG. 6h) and continues from there; otherwise, an instruction 208 is issued to read the output power forward (OPF) port.

After reading the OPF port, an instruction 210 (FIG. 6d) is issued to initialize a debounce timer and to save the first reading. Then, a decision 212 is made whether the debounce time has expired. If not, the decision 212 is continued until the time has expired, at which time a decision 214 is made whether any channels are on. If true, the process goes to decision 264 (FIG. 6h) and continues. Otherwise, an instruction 216 is issued to read the OPF port.

Next, the two OPF values are compared and a decision 218 is made as to whether or not they are equal. If not equal, return is made to step 208 (FIG. 6c) to read OPF port. If equal, an instruction 220 is issued to compute the channel OPF and, pursuant to instruction 222, to store the new OPF and time and date of reading.

Next, an instruction 224 is issued to read the output power reflected (OPR) port, after which the process is repeated (FIGS. 6d and 6e), the OPR value computed and stored together with time and date of reading.

Figures 6F, 6G:
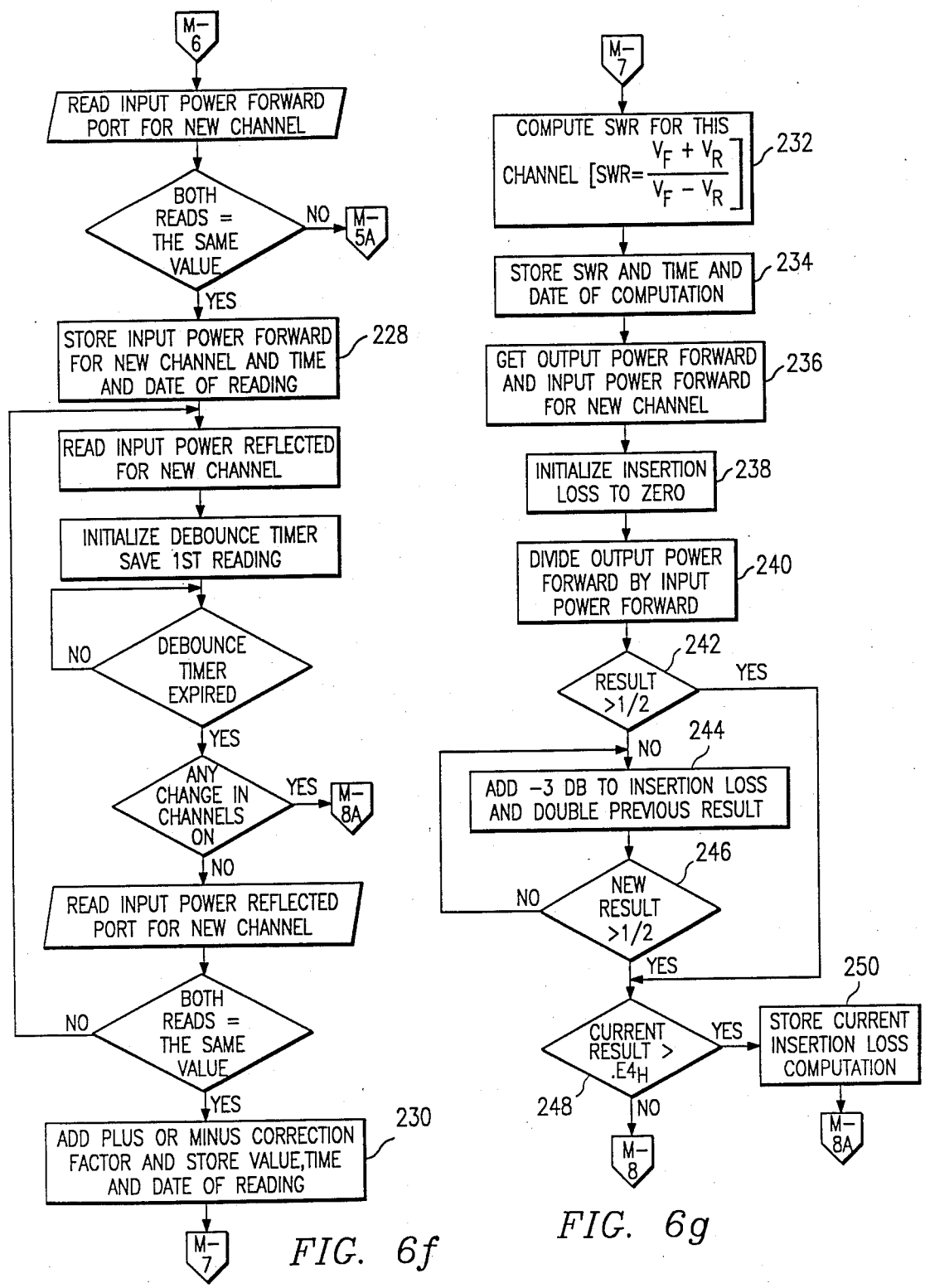
Figure 6H:
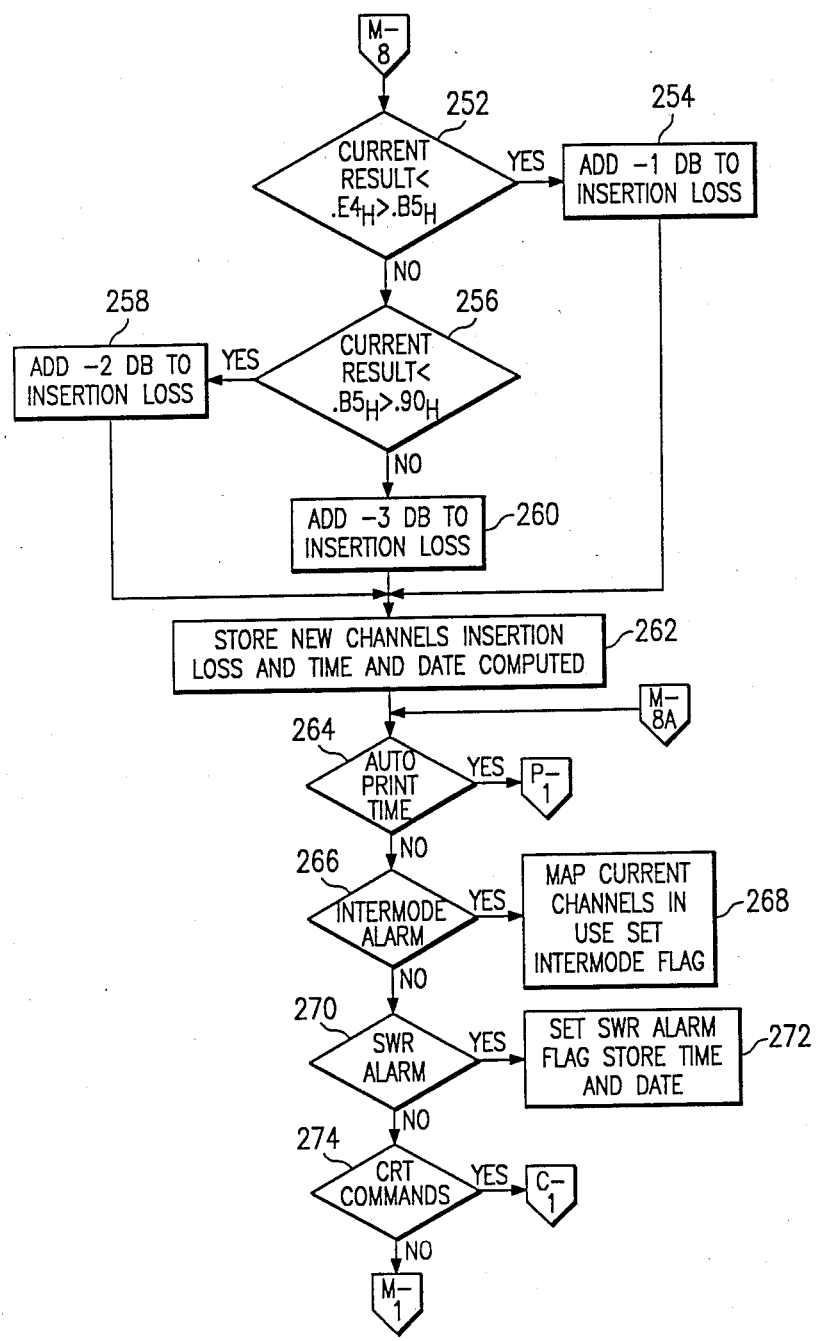

Next, an instruction 226 (FIG. 6e) is issued to read the input power forward (IPF) port for a new channel, repeat the debounce process and store the IPF for the new channel pursuant to instruction 228 (FIG. 6f). The process is repeated for computing the input power reflected (IPR) for the new channel (FIG. 6f) and the new IPR value for the new channel computed and stored pursuant to instruction 30.

After computing the OPF and OPR and IPF and IPR, the voltage standing wave ratio (SWR) (FIG. 6g) for the channel is computed pursuant to instruction 232 using the formula:

$$[SWR=(VF+VR)/(VF-VR)]$$

After computation, an instruction 234 is issued to store the SWR together with the time and date of computation.

Next, an instruction 236 is issued to get OPF and IPF for a new channel and, pursuant to instruction 238, initialize the insertion loss to zero. Then an instruction 240 is issued to divide the OPF by the IPF and a decision 242 made whether the result is greater than one half. If not, an instruction 244 is issued to add −3 dB to insertion loss and double the previous result, and a decision 246 is made whether the new result is greater than one-half. If no, steps 244 and 246 are repeated until the new result is greater than one-half.

If decision 242 was yes or when decision 246 becomes true that the result is greater than one-half, a decision 248 is made whether the current result is greater than $.E4_H$. If true, an instruction 250 is issued to store current insertion loss computation and proceed directly to an auto print time decision 264 and continue; if false, a decision 252 (FIG. 6h) is made whether current result is less than $.E4_H$ which is greater than $.B5_H$. If yes, an instruction 254 is issued to add −1 dB to the insertion loss and proceed to instruction 262; else a decision 256 is made as to whether the current result is less than $.B5_H$ which is greater than $.90_H$. If true, an instruction 258 is issued to add −2 dB to the insertion loss and go to instruction 262; else an instruction is issued to add −3 dB to the insertion loss and proceed to instruction 262. Instruction 262 is issued to store the new channel's insertion loss value and time and date of computation.

Next, a decision 264 is made whether the auto print time is on. If yes, the print subroutine (FIGS. 9a and 9b) is entered; else a decision 266 is made whether an intermode alarm exists. If true, an instruction 268 is issued to map current channels in use and set the intermode flag; else a decision 270 is made whether the SWR alarm is on. If on, an instruction 272 is issued to set SWR alarm flag and store time and date of alarm receipt; else a decision 274 is made whether CRT commands are being received. If true, the CRT subroutine (FIGS. 8a and 8b) is entered; else return is made to decision 156 (FIG. 6a) as to whether the keyboard is active and continue.

Keyboard Subroutine

Figure 7C:
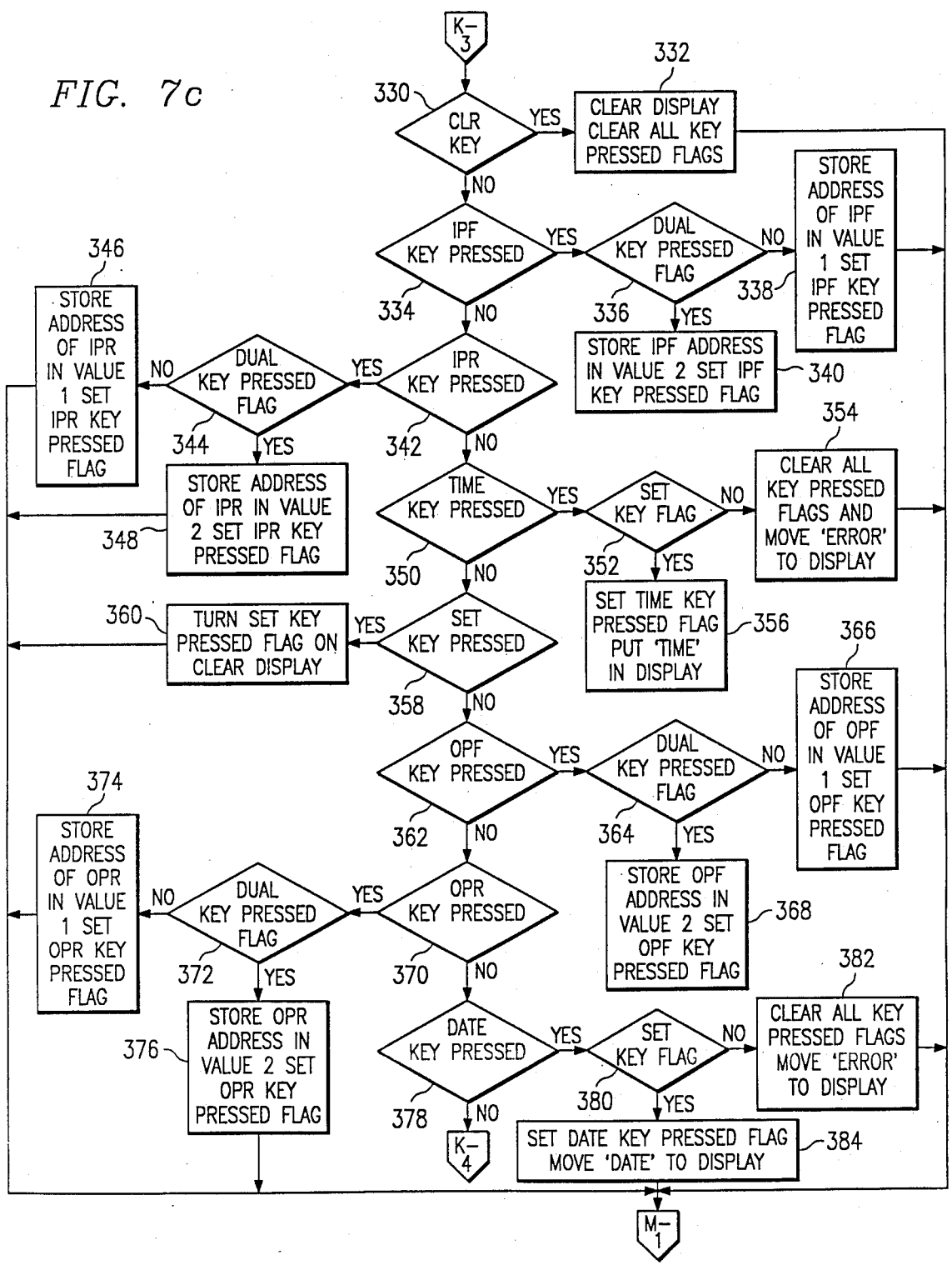
Figure 7D:
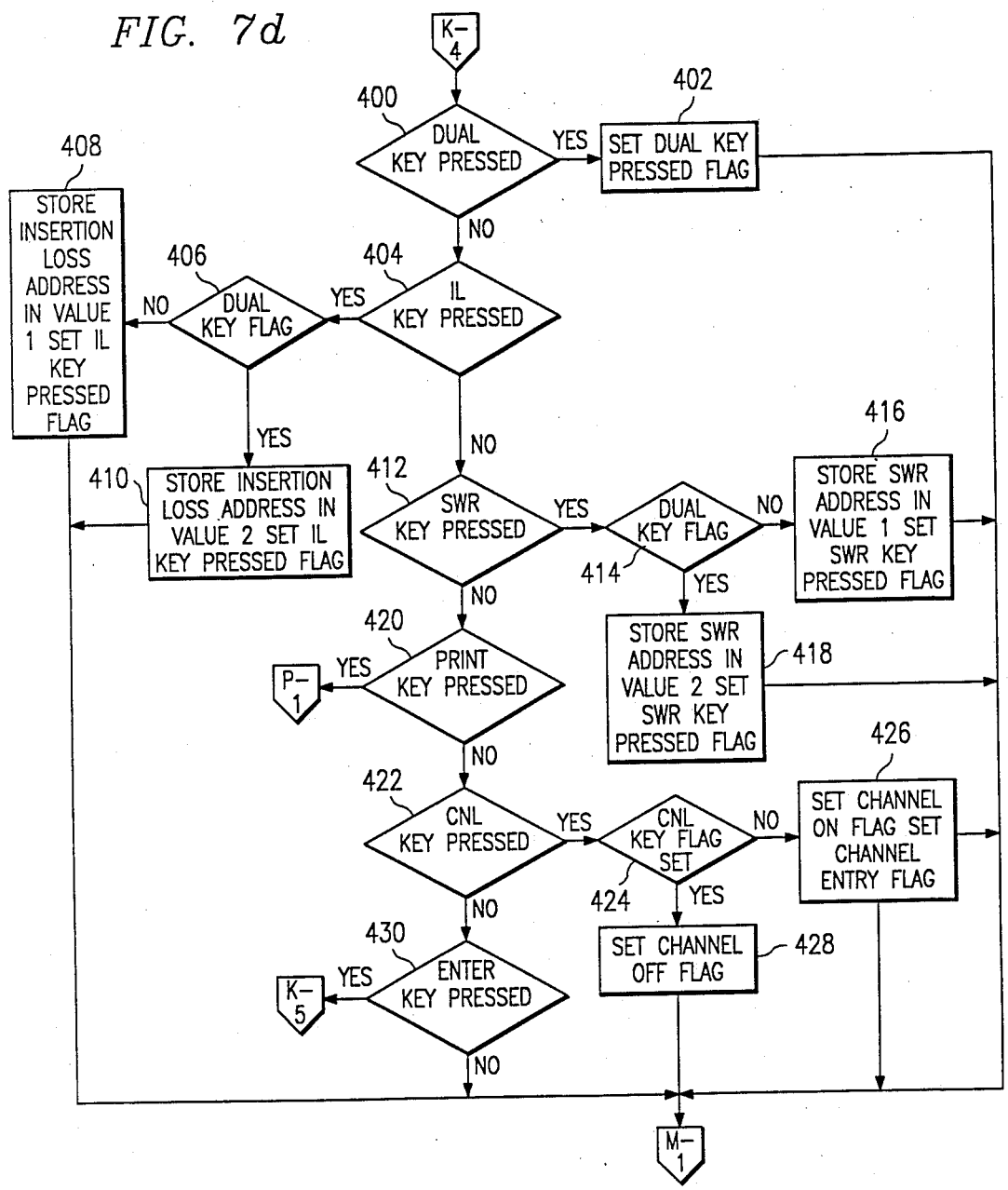
Figure 7E:
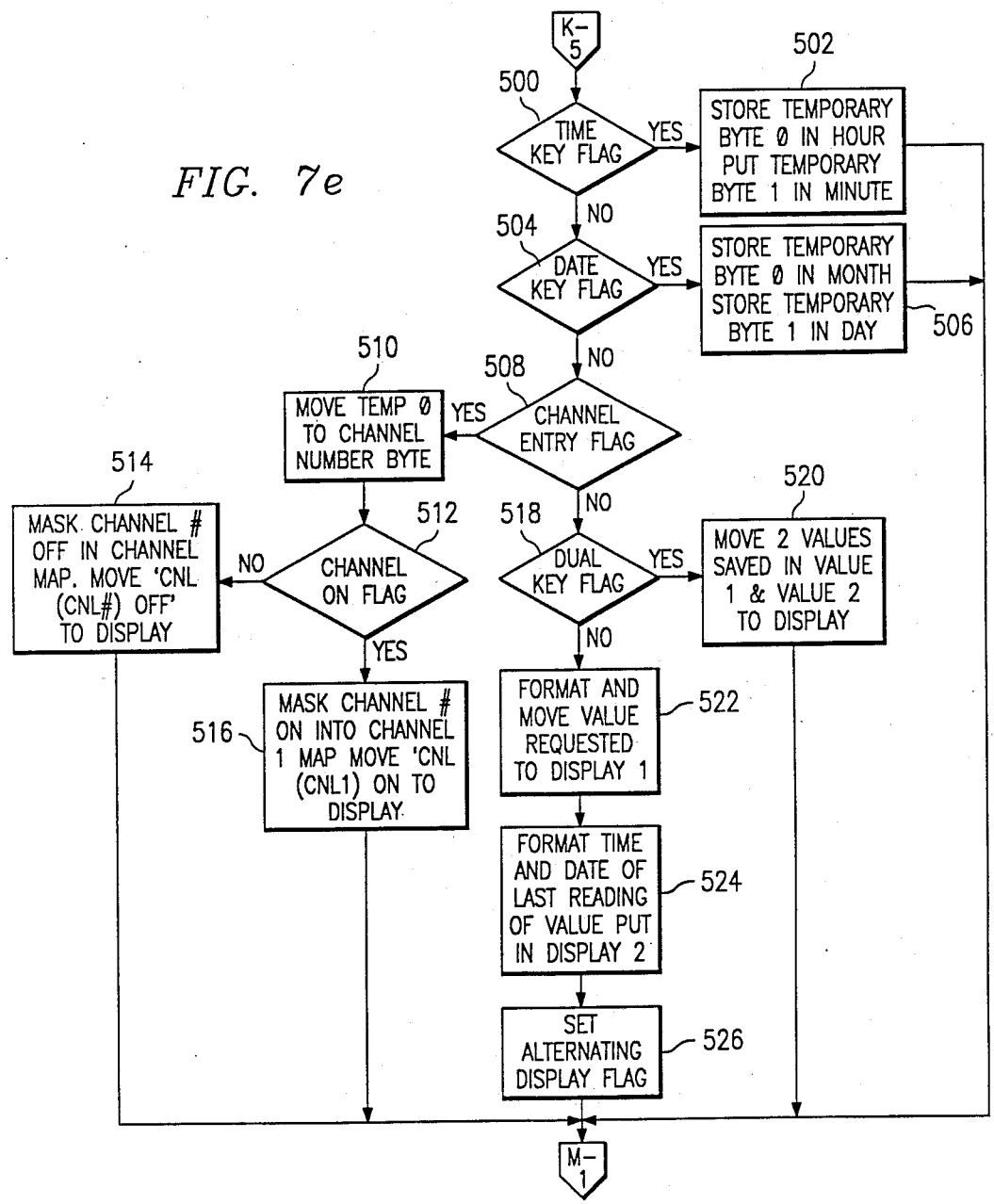

The keyboard subroutine (FIGS. 7a-7e) starts with an instruction 300 to read the keyboard ports, and a decision 302 is made as to whether a key has been pressed or not. If not, return 2 is made to decision 158 (FIG. 6a) of the main program loop for continuation; otherwise, an instruction 304 is issued to initialize the debounce timer. After debounce timer initialization, a decision 306 is made as to whether or not the debounce time has expired; if false, the decision is repeated until the time has expired. If the time has expired, an instruction 308 is issued to read the keyboard ports a second time, and a decision is made as to whether or not the key is still active If not active, a return is made to decision 156 (FIG. 6a) as to whether the keyboard is active and continue. If the key is still active, a decision 312 is made as to whether or not the same key is still active. If not, return is made to instruction 300 to read the keyboard ports. If true, a decision 314 is made as to whether the key pressed is a numeric key or not; if not, the process continues at K-3 (FIG. 7c). If true, a decision 316 (FIG. 7b) is made as to whether or not a first digit entry flag exists. If a first digit entry flag exists, an instruction 318 is issued to clear the display, display the new digit, set the second entry flag, store the digit 10 in temporary byte zero, and return to decision 156 (FIG. 6a), hereinafter referred to as M-1, of the main program loop.

If decision 316 is no, then a decision 320 is made as to whether or not a second digit entry flag exists; if yes, an instruction 322 is issued to add the digit to the temporary byte zero, put the digit in display, set the third entry flag, and return to M-1 (FIG. 6a); else a decision 324 is made if the third digit entry flag exists. If yes, instruction 326 is issued to store digit 10 in temporary byte 1, display the digit, set the fourth entry flag, and return to M-1 (FIG. 6a); else, decision 328 is made as to whether the fourth entry flag exists. If true, the digit is added to the temporary byte 1, displayed, and the first entry flag is set prior to return to M1 (FIG. 6a); else return is made to M1 (FIG. 6a).

The K-3 (FIG. 7c) key routine is to determine the non-numeric key pressed from decision 314 (FIG. 7a). The K-3 routine (FIG. 7c) begins with a decision 330 whether the clear key was pressed. If true, an instruction 332 is issued to clear the display and all key flags pressed, and return is made to M1 (FIG. 6a); else a decision 334 is made whether the IPF key was pressed. If the IPR key was pressed, a decision 336 is made as to whether or not the flag is for a dual key pressed; if false, an instruction 338 is issued to store the IPF address in value 1, set the IPF key pressed flag and return to M1 (FIG. 6a); else an instruction 340 is issued to store the IPF address in value 2, to set the IPF key pressed flag, and to return to M1 (FIG. 6a).

If the IPF key pressed decision 334 is no, a decision 342 is made as to whether or not the IPR key was pressed; if true, a decision 344 is made as to whether or not it was a dual key pressed; if false, an instruction 346 is issued to store the address of IPR in value 1, set the IPR key pressed flag and return to M1 (FIG. 6a). If true, an instruction 348 is issued to store the address of IPR in value 2, set the IPR key pressed flag and return to M-1 (FIG. 6a).

If the IPR key pressed decision 342 was no, a decision 350 is made as to whether or not it was the time key. If true, a decision 352 is made as to whether or not the set key flag is on; if no, an instruction 354 is issued to clear all key pressed flags, display "error" and return to M1 (FIG. 6a); else, set time key pressed flag, put time in display, and return to M1 (FIG. 6a).

If the time key pressed decision 350 was no, a decision 358 is made as to whether or not the set key is pressed. If yes, an instruction 360 is issued to turn on the set key pressed flag, clear the display, and return to M-1 (FIG. 6a).

If the set key pressed decision 358 was no, a decision 362 is made as to whether or not the OPF key was pressed; if true, a decision 364 is made as to whether or not the flag is a dual key pressed flag. If false, an instruction 366 is issued to store the OPF address in value 1, set the OPF key pressed flag and return to M1 (FIG. 6a); if true, an instruction 368 is issued to store the OPF address in value 2, set the OPF key pressed flag and return to M-I (FIG. 6a).

If the OPF key pressed decision 362 was no, a decision 370 is made as to whether or not the OPR key was pressed; if yes, a decision 372 is made as to whether or not the dual key pressed flag is on. If not, an instruction 374 is issued to store the OPR address in value 1, set OPR key pressed flag and return to M-1 (FIG. 6a); else, an instruction 376 is issued to store OPR address in value 2, set OPR key pressed flag and return to M-1 (FIG. 6a).

If the OPR key pressed decision 370 was no, a decision 378 is made as to whether or not it was the date key pressed; if yes, a decision is made as to whether or not the set key flag is on; if not, an instruction 382 is made to clear all key pressed flags, to display the error message, and return to M-1 (FIG. 1a); else, an instruction 384 is issued to set the date key pressed flag, display the date and return to M-1 (FIG. 6a).

If the date key pressed decision 370 was no, a decision 400 (FIG. 7d) is made as to whether or not the dual key was pressed; if yes, an instruction 402 is issued to set the dual key pressed flag and return to M-1 (FIG. 6a). If the dual key was not pressed, a decision 404 is made whether the insertion loss (IL) key was pressed. If yes, a decision 406 is made as to whether or not the dual key flag is on. If not, a decision 408 is issued to store the insertion loss address in value 1, set the IL key pressed flag and return to M-1 (FIG. 6a); else an instruction 410 is issued to store the insertion loss address in value 2, set the IL key pressed flag and return to M-1 (FIG. 6a).

If the decision 404 is that the IL key was not pressed, a decision 412 is made as to whether or not the SWR key was pressed; if yes, a decision 414 is made as to whether or not the dual key flag is on. If not, an instruction 416 is made to store SWR address in value 1, set the SWR key pressed flag and return to M-1 (FIG. 6a); else an instruction 418 is issued to store SWR address in value 2, set SWR key pressed flag and return to M-1 (FIG. 6a).

If the SWR key pressed decision 412 was no, a decision 420 is made as to whether or not the print key was pressed; if yes, the print subroutine (FIGS. 9a and 9b) is entered; else a decision 422 is made as to whether or not the channel key was pressed. If true, a decision 424 is made as to whether or not the channel key flag is set. If no, an instruction 426 is issued to set channel on flag, set channel entry flag and return to M-1 (FIG. 6a); else, an instruction 428 is issued to set channel off flag and return to M-1 (FIG. 6a).

If the decision 422 is that the channel key was not pressed, a decision 430 is made as to whether or not the enter key was pressed; if not, return is made to M-1

(FIG. 6a); if yes, a decision 500 (FIG. 7e) is made as to whether or not the time key flag is on. If yes, an instruction 502 is issued to store temporary byte zero in hours, put temporary byte 1 in minutes and return to M-1 (FIG. 7e); else a decision 504 is made to as to whether or not the date key flag is on. If yes, an instruction 506 is issued to store temporary byte zero in month, store temporary byte one in day and exit to M-1 (FIG. 6a); else a decision 508 is made as to whether or not the channel entry flag is on. If true, an instruction 510 is issued to move temporary zero to channel number byte; else, a decision 512 is made as to whether or not the channel on flag is set. If yes, an instruction 514 is issued to mask channel number off in channel map, move channel off to display and return M1 (FIG. 6a); else, an instruction 516 is issued to mark channel number on into the channel map, display channel on and return to M-1 (FIG. 6a).

If the dual key flag is not on, instructions 522, 524 and 526 are issued, respectively, to format and move value requested to display 1, format time and date of last reading of value for display in display 2, set alternating display flag and return to M-1 (FIG. 6a).

Cathrode Ray Tube Subroutine

The CRT subroutine (FIGS. 8a and 8b) entered into when the decision 164 (FIG. 6a) and 274 (FIG. 6h), respectively, that CRT commands are available from the CRT are true is now described., The CRT subroutine starts with a decision 550 being made as to whether or not the escape key is pressed. If no, the process proceeds to decision 554 as to whether or not the carriage has been returned; else, an instruction 52 is issued to clear the CRT buffer and set the input/output (I/O) pointers to zero before proceeding to the carriage return decision 554.

If the carriage return decision 554 is no, a decision 556 is made as to whether or not the back space character key is pressed. If true, an instruction 558 is issued to decrement buffer input pointer and return; else, an instruction 560 is issued to store the character in the buffer, increment the buffer input pointer and return.

However, if the carriage return decision 554 is true, an instruction 562 is issued to initialize the buffer I/O pointers to zero.

Figure 9C:
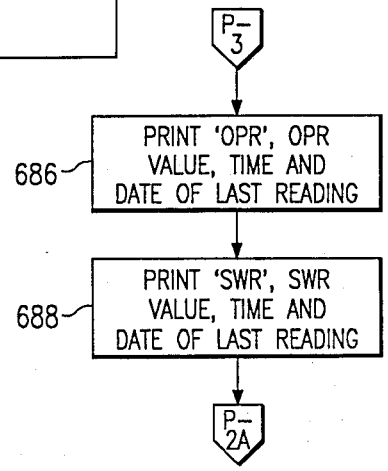
FIGS. 9a–9c are printer processing flowcharts for the power monitor of the present invention.

Next, a decision 564 is (1) is made as to whether or not buffer (1) is numeric; if true, an instruction 566 is issued to add buffer (1) to 10 buffer (0), store in channel index, set output pointer to three and proceed to decision 576 whether buffer (X) equal space; else a decision 568 is made as to whether or not buffer (0) is numeric. If no, a decision 570 is made as to whether or not buffer (0) is a print. If no, an instruction 572 is issued to clear print buffer and pointers and return; else the print subroutine (FIGS. 9a-9c) is entered.

If the buffer (0) numeric decision 568 is yes, an instruction 574 is issued to store buffer (0) in channel and set index output pointer to 2 before the decision 576 is made as to whether or not the buffer (X) is a space. If decision 576 is true, an instruction 578 is issued to increment output pointer and return to decision 576; else, if an instruction 580 is issued to compare buffer (X) through buffer (X+2) to command JWP table.

Next, a decision 582 (FIG. 8b) is made as to whether or not the command is report OPR command; if yes, an instruction 584 is issued to send channel number, "OPR", OPR value, time and date to the CRT for display and proceed to instruction 606 to clear the CRT buffer to spaces and clear I/O pointers; else, a decision 586 is made as to whether or not the command is to report OPF. If yes, an instruction 588 is issued to send the channel number, "OPF", OPF value, time and date to CRT for display and proceed to the clear instruction 606; else, a decision 590 is made as to whether or not the command is a report IPR command.

If decision 590 is that the command is a report command, an instruction 592 is issued to send the channel number, "IPR", IPR value, time and date to the CRT for display and proceed to the clear instruction 606; else, a decision 594 is made as to whether or not the command is to report IPF. If true, an instruction 596 is issued to send the channel number, "IPF", IPF value, time and date to the CRT for display and proceed to the clear instruction 606; else a decision 598 is made as to whether or not the command is to report the insertion loss.

If the command is a report command, an instruction 600 is issued to send the channel number, "IL", IL value, time and date to CRT for display and proceed to clear instruction 606; else a decision 602 is made as to whether or not the command is to report SWR value. If true, an instruction 604 is issued to send the channel number, "SWR", SWR value, time and date of reading to the CRT for display and proceed to the clear instruction 606; else proceed directly to the clear instruction 606 and return.

Print Subroutine

Finally, the print subroutine which is entered into when decisions 264 (FIG. 6h), 420 (FIG. 7d), and 570 (FIG. 8a) are positive will be described. At start instructions 650, 652, and 654 are issued, respectively, to put "printing" into display and clear print buffer to spaces, move "status report" to buffer, output buffer and clear buffer, move current time and date to buffer, output buffer and clear buffer.

Then a decision 656 is made as to whether or not the intermode flag is on; if no, a decision 660 is made as to whether or not the SWR alarm flag is on; else an instruction 658 is issued to move "TRNSMTR INTER MD" and channels on when intermode is detected and time and date moved to buffer and then output from buffer.

If the decision 660 is no, a decision 664 is made to correct SWR alarm flag to on; else, an instruction 662 is issued to move "ANT SWR ALM" and time and date of alarm to buffer, output the buffer, clear the buffer, and proceed to the COR SWR alarm flag decision 664.

Figures 9A, 9B:
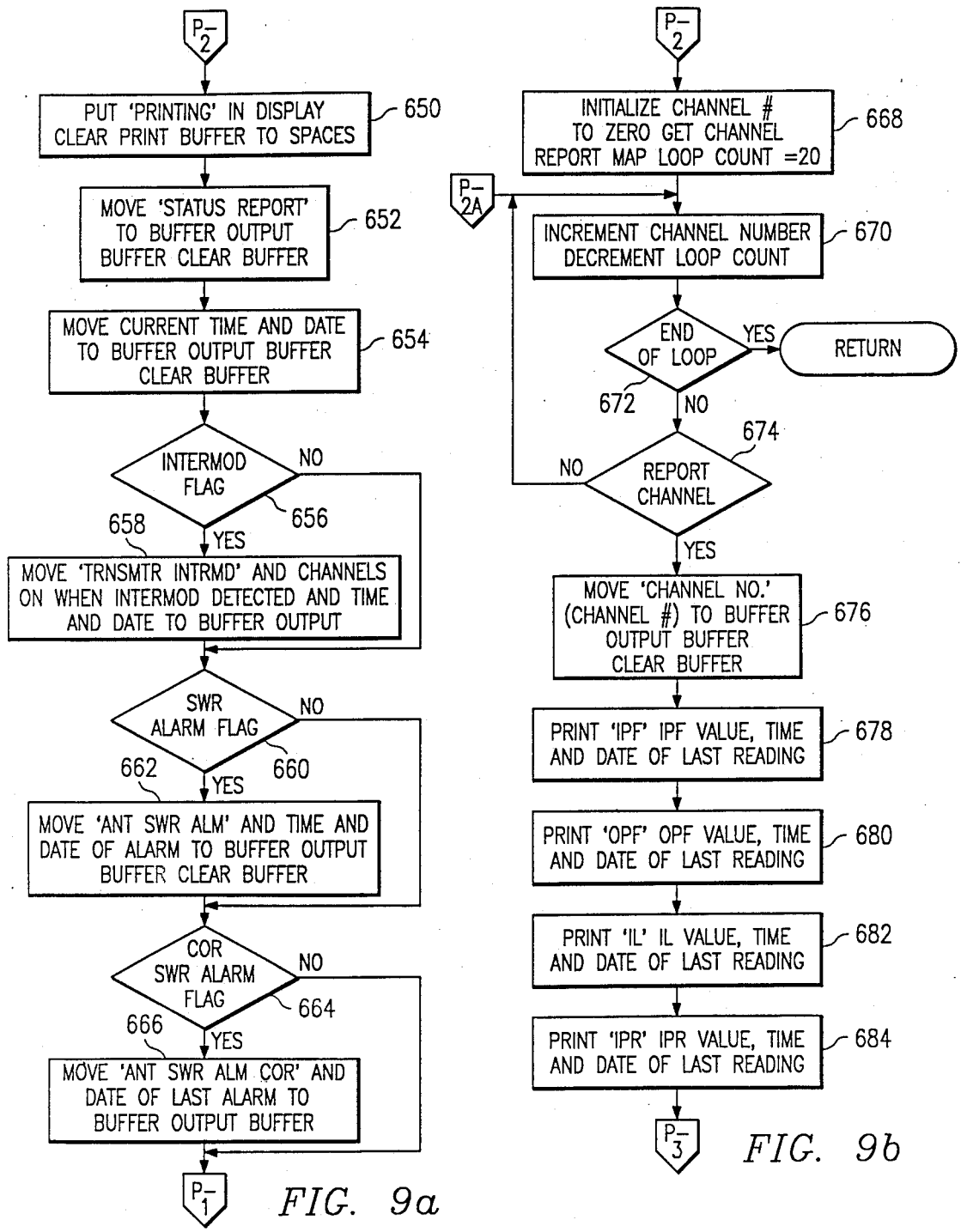

If decision 664 is true, then an instruction 666 is issued to move "ANT SWR ALM COR" and time and date of last alarm to buffer, output buffer, and proceed to instruction 68; else go to instruction 668 (FIG. 9b).

Instruction 668 is issued to initialize channel number to zero, get the channel report map and set loop count to twenty. Then, an instruction 670 is issued to increment channel number and decrement loop count.

Next, a decision 672 is made as to whether or not the end of the loop has been reached. If yes, return is made; else a decision 674 is made as to whether or not the channel is a report channel. If no, return is made to instruction 670; if yes, a series of instructions 676, 678, 680, 682, 684, 686, and 688 are issued, and return is made to instruction 670 and the process repeated until the end of loop is reached. Instruction 676 is to move the channel number to buffer, output the buffer, and clear the buffer. Instruction 678 is to print "IPF", IPF value, time and date of last reading. Instruction 680 is to print "OPF", OPF value, time and date of last reading. Instruction 682 is to print "IL", IL value, time and date of last reading. Instruction 684 is to print "IPR", IPR value, time and date of last reading. Instruction 686 (FIG. 9c) is to print "OPR", OPR value, time and date of last reading. Finally, instruction 688 is to print "SWR", SWR value, time and date of last reading.

Although only a single embodiment of the invention has been disclosed, it will be apparent to a person skilled in the art that various modifications to the details of construction shown and described may be made without departing from the scope of this invention.

What is claimed is:

1. An electronic communication monitoring apparatus for monitoring a communication system having a transmitter, and a site housing for the transmitter, comprising:

a power sensor means for selective connection to the communication system for producing selected power measurements;

a plurality of environmental sensors connected to the site housing for determining environmental conditions affecting the site housing; and a programmable controller means located in the site housing and connected to the power sensor means and plurality of environmental sensors, said programmable controller means including a display means, a power monitoring means operatively connected to the power sensor means for continuously monitoring operations of the communication system including power measurements for display by the display means, means for storing maintenance parameters, comparison means connected to power monitoring means for comparing the power measurements with the maintenance parameters, means connected to the comparison means for signaling a need for maintenance operations prior to failure of the communication system, environmental sensor monitoring means connected to the plurality of environmental sensors for detecting environmental signals indicative of adverse environmental conditions associated with the transmitter station housing, and an alarm means connected to the environmental sensor monitoring means for producing alarms indicative of adverse environmental conditions.

2. An electronic monitoring apparatus according to claim 1 wherein the programmable controller includes a channel selection means for monitoring a plurality of communication channels of the communication system and means for changing selected channel operating parameters of the programmable controller.

3. An electronic monitoring apparatus according to claim 1 wherein the power sensor means includes sensors within the communication system to provide selected power measurements for tunable components of the communication system, and wherein said programmable controller display means is a multiple display for simultaneously displaying power measurements in support of tuning the tunable components.

4. An electronic system monitoring apparatus according to claim 1 wherein the programmable controller includes expansion means for connecting a plurality of communication systems for operation monitoring.

5. An electronic monitoring apparatus according to claim 1 wherein the programmable controller further includes storage means for storing the communication system's operating information and alarm information, and a printer connected to the programmable controller for printing out system operating information and alarm information from the storage means.

6. An electronic monitoring apparatus according to claim 1 further including a computer positioned remotely to the programmable controller, said computer including means connected to the programmable controller for reading communication system operating parameter information into and writing performance information including alarms from the programmable controller.

7. An electronic communication monitoring system comprising:

a plurality of electromagnetic energy transmitting antennas;

a plurality of communication transmitter channels connected to each of the antennas, each communication transmitter channel including a transmitter, a power circulator connected to the transmitter, and a combiner connected to the circulator, said combiner being connected to an antenna of the plurality of antennas;

a plurality of power sensors connected to the communication transmitter channels including an analog signal producing sensor means connected to each communication channel for producing analog signals indicative of transmitter input power to the combiner and reflected transmitter power (IPR) on an input side of the combiner and an analog signal producing sensor means connected to each communication channel for producing analog signals indicative of reflected power (OPR) from an antenna side of the combiner and combiner power (OPF) to the antenna;

a controller station including a programmable controller and a plurality of environmental sensors connected to the controller station for producing signals indicative of controller station environmental conditions taken from a group consisting of flooding, fire, temperature, and unauthorized entry; said programmable controller having: means connected to the plurality of power sensors for producing measurements of the IPF, IPR, OPF, OPR, means connected to the power sensors for computing transmitter and antenna voltage standing wave ratios, means connected to the power sensors for determining combiner insertion loss per channel, clock means including means for obtaining time and date of measurements, and means connected to the means for obtaining time and date of measurements for recording the time and date of the most recent channel measurement, means connected to the environmental sensors for automatically producing alarm signals indicative of abnormal environmental conditions, means containing preselected acceptable normal measurements, comparator means connected to the measurement producing means and means containing the preselected acceptable normal measurements for comparing operational measurements to preselected acceptable normal measurements and means connected to the comparator means for producing alarm signals indicative of outside the normal measurements, means for displaying locally the measurements made either singly or in combination, means for reading operating parameters into and writing measurement information from the programmable controller, and communication port means for connecting either a printer or a remotely located computer or both; and a remotely located station including a computer operatively connected to the programmable controller for reading operating parameters into and writing data including measurement data and alarm data from the programmable computer.

8. An electronic communication monitoring system comprising:

an antenna means including an antenna and a plurality of antenna systems, each antenna system including a plurality of communication transmitter channels, each communication transmitter channel including a transmitter, a power circulator connected to the transmitter, and a combiner of a combiner bank;

a plurality of power sensors connected to the communication transmitter channels including an analog signal producing sensor means connected to each communication channel for producing analog signals indicative of transmitter input power (IPF) to the combiner and reflected transmitter power (IPR) on an input side of the combiner, and an analog signal producing sensor means connected to each communication channel for producing analog signals indicative of reflected power (OPR) from an antenna side of the combiner and combiner power (OPF) to the antenna;

a controller station including a programmable controller and a plurality of environmental sensors connected to the controller station for producing signals indicative of controller station environmental conditions taken from a group consisting of multiple digital and/or analog signals; said programmable controller having: means connected to the plurality of power sensors for producing measurements of the IPF, IPR, OPF, and OPR, means connected to the power sensors for computing transmitter and antenna voltage standing wave ratios, means connected to the power sensors for determining combiner insertion loss per channel, clock means including means for obtaining time and date of measurements, and means connected to the means for obtaining time and date of measurements for recording the time and date of the most recent channel measurement, means connected to the environmental sensors for automatically producing alarm signals indicative of abnormal environmental conditions, means containing preselected acceptable normal measurements, comparator means connected to the measurement producing means and means containing the preselected acceptable normal measurements for comparing operational measurements to preselected acceptable normal measurements, means connected to the comparator means for producing alarm signals indicative of outside the normal measurements, means for displaying locally the measurements made either singly or in combination, means for reading operating parameters into and writing measurement information from the programmable controller, and communication port means for connecting either a printer or a remotely located computer or both.

* * * * *

UNITED STATES PATENT AND TRADEMARK OFFICE
CERTIFICATE OF CORRECTION

PATENT NO. : 4,823,280
DATED : April 18, 1989
INVENTOR(S) : Peter Mailandt and John R. Hicks It is certified that error appears in the above-identified patent and that said Letters Patent is hereby corrected as shown below:

Abstract, line 1, "electric" should be --electronic--.

Abstract, line 16, "SWR" should be --standing wave ratio--.

Column 8, line 18, "30" should be --230--.

Column 9, line 6, delete "2".

Column 10, line 17, "M-I" should be --M-1--.

Column 11, line 29, after "true" insert --,--.

Column 11, line 33, "52" should be --552--.

Column 11, line 46, delete "is (1)".

Column 11, line 61, "if" should be --if no,--.

Column 11, line 63, "through" should be ---buffer--.

Column 12, line 54, "68" should be --668--.

Column 13, line 62, delete "system".

UNITED STATES PATENT AND TRADEMARK OFFICE
CERTIFICATE OF CORRECTION

PATENT NO. : 4,823,280

DATED : April 18, 1989

INVENTOR(S) : Peter Mailandt and John R. Hicks

It is certified that error appears in the above-identified patent and that said Letters Patent is hereby corrected as shown below:

Column 14, line 28, after "input power" insert -- (IPF)--

Signed and Sealed this

Twenty-first Day of November, 1989

Attest:

JEFFREY M. SAMUELS

Attesting Officer — Acting Commissioner of Patents and Trademarks